US012709008B2

(12) United States Patent
Hamilton et al.

(10) Patent No.: US 12,709,008 B2
(45) **Date of Patent: *Aug. 18, 2026**

(54) CLUTTER-CLEARING ROBOTIC SYSTEM

(71) Applicant: Clutterbot, Inc., Claymont, DE (US)

(72) Inventors: Justin David Hamilton, Wellington (NZ); Kalen Fletcher Wolfe, Wellington (NZ); Jack Alexander Bannister-Sutton, Wellington (NZ); Bryden James Frizzell, Wellington (NZ)

(73) Assignee: Clutterbot, Inc., Claymont, DE (US)

( * ) Notice: Subject to any disclaimer, the term of this patent is extended or adjusted under 35 U.S.C. 154(b) by 82 days.

This patent is subject to a terminal disclaimer.

(21) Appl. No.: 18/767,784

(22) Filed: Jul. 9, 2024

(65) Prior Publication Data

US 2024/0359327 A1 Oct. 31, 2024

Related U.S. Application Data

(63) Continuation of application No. 17/537,798, filed on Nov. 30, 2021, now Pat. No. 12,064,880.

(Continued)

(51) Int. Cl.

*B25J 9/00* (2006.01)
*B25J 9/16* (2006.01)
*B25J 11/00* (2006.01)

(52) U.S. Cl.

CPC ......... *B25J 9/1666* (2013.01); *B25J 11/0085* (2013.01)

(58) Field of Classification Search

CPC ...... B25J 9/1666; B25J 11/0085; B25J 5/007; B25J 9/162; B25J 9/1697; B25J 11/008;

(Continued)

(56) References Cited

U.S. PATENT DOCUMENTS 6,338,013 B1 1/2002 Ruffner
6,810,305 B2 10/2004 Kirkpatrick, Jr.

(Continued)

FOREIGN PATENT DOCUMENTS

AU 2015218522 A1 9/2015
AU 2020101865 A4 10/2020

(Continued)

OTHER PUBLICATIONS

Bahl, Laavanye et al. "CuBi: Room Decluttering Robot". May 2019. Retrieved from the Internet <URL: https://mrsdprojects.ri.cmu.edu/2018teamd/wp-content/uploads/sites/34/2019/05/TeamD_CDRR.pdf> (Year: 2019).*

(Continued)

*Primary Examiner* — Khoi H Tran
*Assistant Examiner* — Tien Minh Le
(74) *Attorney, Agent, or Firm* — Carnelain Law, LLC

(57) ABSTRACT

A robot is operated to navigate an environment using cameras and map the type, size and location of objects. The system determines the type, size and location of objects and classifies the objects for association with specific containers. For each category of object with a corresponding container, the robot chooses a specific object to pick up in that category, performs path planning and navigates to objects of the category, to either organize or pick up the objects. Actuated pusher arms move other objects out of the way and manipulates the target object onto the front bucket to be carried.

20 Claims, 35 Drawing Sheets

Related U.S. Application Data

(60) Provisional application No. 63/253,867, filed on Oct. 8, 2021, provisional application No. 63/119,533, filed on Nov. 30, 2020.

(58) Field of Classification Search
CPC .................... B25J 9/0087; B25J 19/02; G05B 2219/45084; G05D 1/0246; G05D 1/0274; G05D 1/243; G05D 2111/52; G05D 1/242; G05D 1/246; G06T 7/70
See application file for complete search history.

(56) References Cited

U.S. PATENT DOCUMENTS

| | | | |
|---|---|---|---|
| 9,089,969 B1 | 7/2015 | Theobald | |
| 9,827,677 B1 | 11/2017 | Gilbertson et al. | |
| 9,827,678 B1 * | 11/2017 | Gilbertson | A47L 11/4055 |
| 10,207,408 B1 | 2/2019 | Ebrahimi Afrouzi | |
| 11,020,858 B2 | 6/2021 | Amacker et al. | |
| 11,407,118 B1 | 8/2022 | Augenbraun et al. | |
| 11,409,296 B1 | 8/2022 | Kim et al. | |
| 11,720,117 B1 | 8/2023 | Kim et al. | |
| 11,789,457 B1 | 10/2023 | Woo et al. | |
| 12,064,880 B2 | 8/2024 | Hamilton et al. | |
| 12,287,639 B1 | 4/2025 | Queiroz et al. | |
| 12,310,545 B1 | 5/2025 | Hamilton | |
| 2002/0116089 A1 | 8/2002 | Kirkpatrick, Jr. | |
| 2006/0116973 A1 | 6/2006 | Okamoto et al. | |
| 2007/0239315 A1 | 10/2007 | Sato et al. | |
| 2009/0137348 A1 | 5/2009 | Tsai | |
| 2016/0260161 A1 | 9/2016 | Atchley et al. | |
| 2017/0329333 A1 | 11/2017 | Passot et al. | |
| 2018/0104815 A1 | 4/2018 | Yang | |
| 2018/0284792 A1 | 10/2018 | Kleiner et al. | |
| 2018/0312095 A1 | 11/2018 | Eletrabi | |
| 2018/0329425 A1 | 11/2018 | Watts | |
| 2019/0217476 A1 | 7/2019 | Jiang et al. | |
| 2020/0026301 A1 | 1/2020 | Taylor | |
| 2020/0086182 A1 | 3/2020 | New et al. | |
| 2020/0156246 A1 | 5/2020 | Srivastav | |
| 2020/0279436 A1 | 9/2020 | Bleyer et al. | |
| 2020/0376675 A1 | 12/2020 | Bai et al. | |
| 2021/0038950 A1 | 2/2021 | Sullivan | |
| 2021/0069904 A1 | 3/2021 | Duan et al. | |
| 2021/0128989 A1 | 5/2021 | Legg et al. | |
| 2021/0132213 A1 | 5/2021 | Advani et al. | |
| 2021/0138311 A1 | 5/2021 | Wang et al. | |
| 2021/0339393 A1 | 11/2021 | Dan | |
| 2021/0373560 A1 * | 12/2021 | Koga | G05D 1/689 |
| 2022/0168893 A1 | 6/2022 | Hamilton et al. | |
| 2022/0171907 A1 | 6/2022 | Chang et al. | |
| 2022/0253056 A1 | 8/2022 | Ranjan et al. | |
| 2022/0398775 A1 | 12/2022 | Streem et al. | |
| 2023/0015751 A1 | 1/2023 | Serackis et al. | |
| 2023/0116896 A1 | 4/2023 | Hamilton et al. | |
| 2023/0206755 A1 | 6/2023 | Jha et al. | |
| 2023/0401837 A1 | 12/2023 | Yan et al. | |
| 2024/0142994 A1 | 5/2024 | Ebrahimi Afrouzi | |
| 2024/0192690 A1 | 6/2024 | Ebrahimi Afrouzi et al. | |
| 2024/0218863 A1 | 7/2024 | Eletrabi et al. | |
| 2024/0292990 A1 | 9/2024 | Hamilton | |
| 2024/0424355 A1 | 12/2024 | Zhang et al. | |
| 2024/0428560 A1 | 12/2024 | Buerkle et al. | |

FOREIGN PATENT DOCUMENTS

| | | | |
|---|---|---|---|
| AU | 2022360549 | A1 | 5/2024 |
| CN | 202526850 | U | 11/2012 |
| CN | 107137890 | A | 9/2017 |
| CN | 107378958 | A | 11/2017 |
| CN | 107650147 | A | 2/2018 |
| CN | 108217183 | A | 6/2018 |
| CN | 108786065 | A | 11/2018 |
| CN | 110558900 | A | 12/2019 |
| CN | 210616549 | U | 5/2020 |
| CN | 111633627 | A | 9/2020 |
| CN | 112828847 | A | 5/2021 |
| CN | 114468859 | A | 5/2022 |
| CN | 218552245 | U | 3/2023 |
| CN | 116616642 | A | 8/2023 |
| CN | 116709962 | A | 9/2023 |
| CN | 117442132 | A | 1/2024 |
| DE | 102017112740 | A1 | 12/2018 |
| EP | 1942223 | B1 | 7/2008 |
| EP | 3766591 | A1 | 1/2021 |
| JP | 2019092999 | A | 6/2019 |
| JP | 2020138046 | A | 9/2020 |
| JP | 2023052271 | A | 4/2023 |
| KR | 1020190130941 | | 11/2019 |
| KR | 20200126036 | A | 11/2020 |
| KR | 20230139407 | A | 10/2023 |
| KR | 20240133919 | A | 9/2024 |
| WO | 2012103525 | A2 | 8/2012 |
| WO | 2016105702 | A1 | 6/2016 |
| WO | 2019126332 | A1 | 6/2019 |
| WO | 2020071669 | A1 | 4/2020 |
| WO | 2020190272 | A1 | 9/2020 |
| WO | 2022029730 | A1 | 2/2022 |
| WO | 2022115761 | A1 | 6/2022 |
| WO | 2023031620 | A1 | 3/2023 |
| WO | 2023060285 | A1 | 4/2023 |
| WO | 2023110103 | A1 | 6/2023 |
| WO | 2025184405 | A1 | 9/2025 |

OTHER PUBLICATIONS

Bahl, Laavanye et al. "Cu Bi: Room De cluttering Robot". May 2019. Retrieved from the Internet (Year: 2019) Carnegie Mellon University pp. 1-29.

PCT/US2022/077917 International Search Report dated Jan. 25, 2023.

PCT/US2022/077917 Written Opinion of the ISA dated Jan. 25, 2023.

Official Action Translation from Japanese Patent Office dated Apr. 2, 2024 for application JP 2023-533262 100107766.

PCT/US2021/061143 International Search Report dated Feb. 8, 2022.

PCT/US2021/061143 Written Opinion of the International Searching Authority dated Feb. 6, 2022.

Bahl, Laavanye et al. "Cu Bi: A Decluttering Robot". Dec. 2018. Retrieved from the Internet (Year: 2018).

Changsheng Shen (Bobby), "CMU MRSD 2020: Team D—Cu Bi—A Decluttering Robot," YouTube, Dec. 10, 2019. https://www.youtube.com/watch?v=IA-MaF _m8QA (accessed Jan. 19, 2026). (Year: 2019).

China National Intellectual Property Administration Application No. 202180080246.2 filing date May 30, 2023 First Office Action, entire document dated Dec. 3, 2025.

Canberk Alper et al: "Cloth Funnels: Canonicalized-Alignment for Multi-Purpose Garment Manipulation", 2023 IEEE International Conference on Robotics and Automation (ICRA), IEEE, May 29, 2023 (May 29, 2023), pp. 5872-5879.

Guanqi Chen et al: "Language-Augmented Symbolic Planner for Open-world Task Planning", arxiv.org, Cornell University Library, Jul. 13, 2024.

PCT/US25/43792, International Search Report, Dec. 10, 2025.

PCT/US25/43792, Written Opinion, Dec. 10, 2025.

PCT/US25/43802, International Search Report, Dec. 16, 2025.

PCT/US25/43802, Written Opinion, Dec. 16, 2025.

PCT/US25/43805, International Search Report, Dec. 16, 2025.

PCT/US25/43805, Written Opinion, Dec. 16, 2025.

PCT/US25/44087, International Search Report, Jan. 8, 2026.

PCT/US25/44087, Written Opinion, Jan. 8, 2026.

PCT/US25/44271, International Search Report, Jan. 5, 2026.

PCT/US25/44271, Written Opinion, Jan. 5, 2026.

PCT/US25/44310, International Search Report, Nov. 27, 2025.

PCT/US25/44310, Written Opinion, Nov. 27, 2025.

PCT/US25/44316, International Search Report, Jan. 8, 2026.

PCT/US25/44316, Written Opinion, Jan. 8, 2026.

(56) References Cited

OTHER PUBLICATIONS

PCT/US25/44322, International Search Report, Dec. 11, 2025.
PCT/US25/44322, Written Opinion, Dec. 11, 2025.
PCT/US25/44326, International Search Report, Dec. 15, 2025.
PCT/US25/44326, Written Opinion, Dec. 15, 2025.
Tsurumine Yoshihisa et al: "Variationally Autoencoded Dynamic Policy Programming for Robotic Cloth Manipulation Planning based on Raw Images", 2022 IEEE/SICE International Symposium on System Integration (SII), IEEE, Jan. 9, 2022, pp. 416-421.
Gonzalez et al., Multi-Li DAR Mapping for Scene Segmentation in Indoor Environments for Mobile Robots, May 2022, MDPI, pp. 1-19. (Year: 2022).

* cited by examiner

CLUTTER-CLEARING ROBOTIC SYSTEM

CROSS REFERENCE TO RELATED APPLICATIONS

This application is a continuation of U.S. patent application Ser. No. 17/537,798, filed Nov. 30, 2021, which claims priority and benefit under 35 USC 119 (e) to U.S. application Ser. No. 63/119,533, filed on Nov. 30, 2020 and titled “CLUTTER-CLEARING ROBOTIC SYSTEM”, and to U.S. application Ser. No. 63/253,867, titled “Augmented Reality Robotic Interface” filed on Oct. 8, 2021, each of which is incorporated herein by reference in its entirety.

BACKGROUND

Objects underfoot represent not only a nuisance but a safety hazard. Thousands of people each year are injured in a fall at home. A floor cluttered with loose objects may represent a danger, but many people have limited time in which to address the clutter in their homes. Automated cleaning or decluttering robots may represent an effective solution.

While a fully autonomous decluttering robot with rudimentary look up capabilities may be adequate to the task of picking up objects on the floor of any room, a user may desire the ability to achieve more nuanced control over robotic behavior and the classification and destination of particular objects unique to their home. The robot may further need to communicate with the user clearly when a task is impeded, or when situational parameters are encountered that are not accounted for in the robot's programming. Most users, however, may not be experts in the fields of robotics and artificial intelligence.

There is, therefore, a need for a way for a user to interact with a decluttering robot in an intuitive and powerful way that does not rely on in-depth programming knowledge. This process of interaction may allow the user to train the robot based on their specific decluttering needs, instruct a robot to perform actions outside of a preset routine, and receive indications when a robot needs assistance to continue or complete an assigned task.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
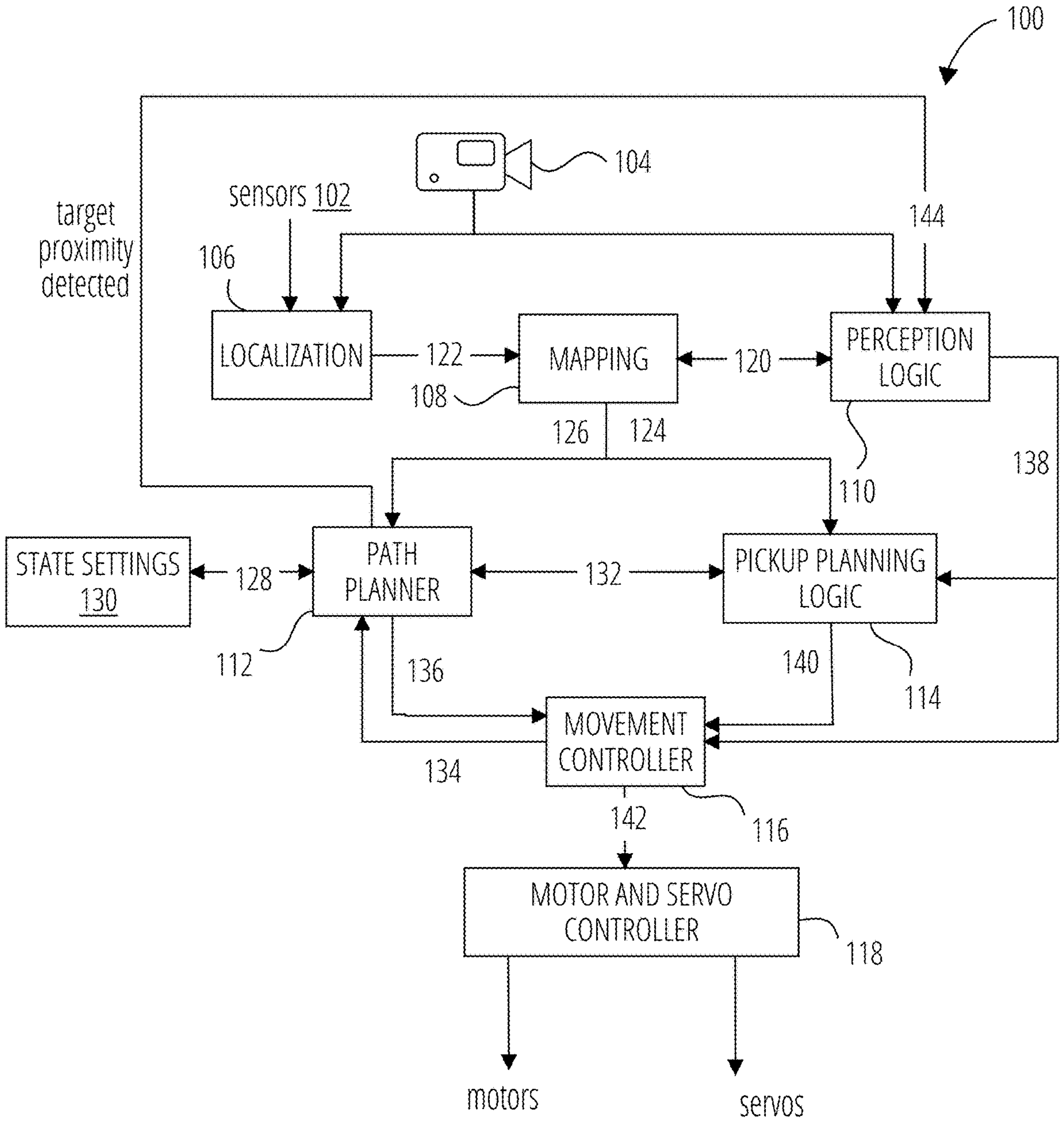
FIG. 1 depicts a robotics system 100 in accordance with one embodiment.
Figure 2B:
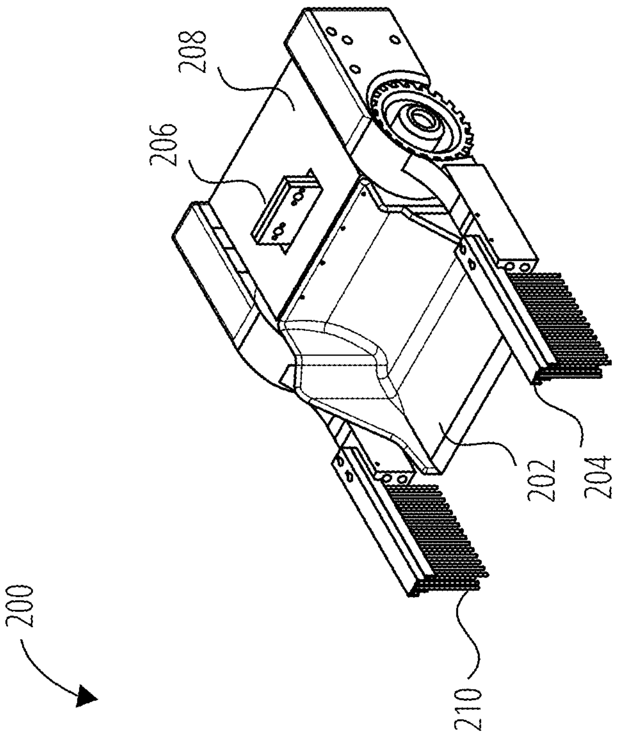
FIG. 2B depicts a perspective view of the robot 200 in accordance with one embodiment, with the bucket in a down position and the manipulators in an open configuration.
Figure 2D:
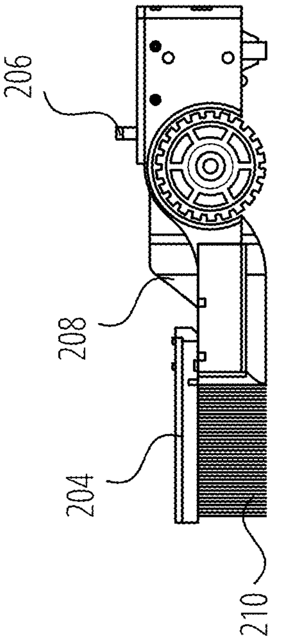
FIG. 2D depicts a side view of the robot 200 in accordance with one embodiment, with the bucket in a down position and the manipulators in an open configuration.
Figure 2A:
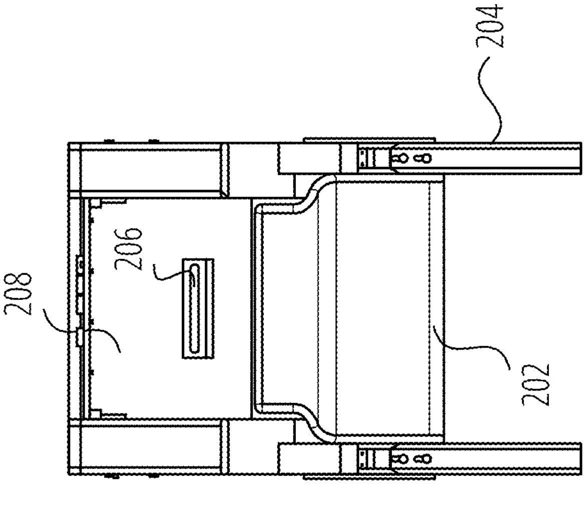
FIG. 2A depicts a top view of a robot 200 in accordance with one embodiment, with the bucket in a down position and the actuator arms (manipulators) in an open configuration.
Figure 2C:
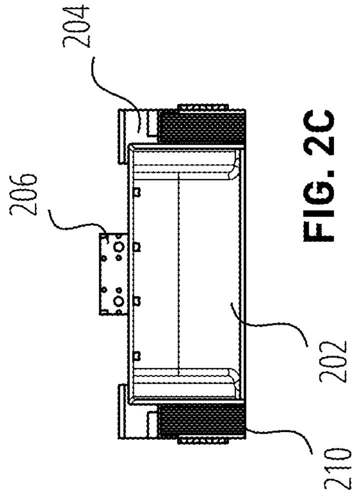
FIG. 2C depicts a front view of the robot 200 in accordance with one embodiment, with the bucket in a down position and the manipulators in an open configuration.
Figure 2F:
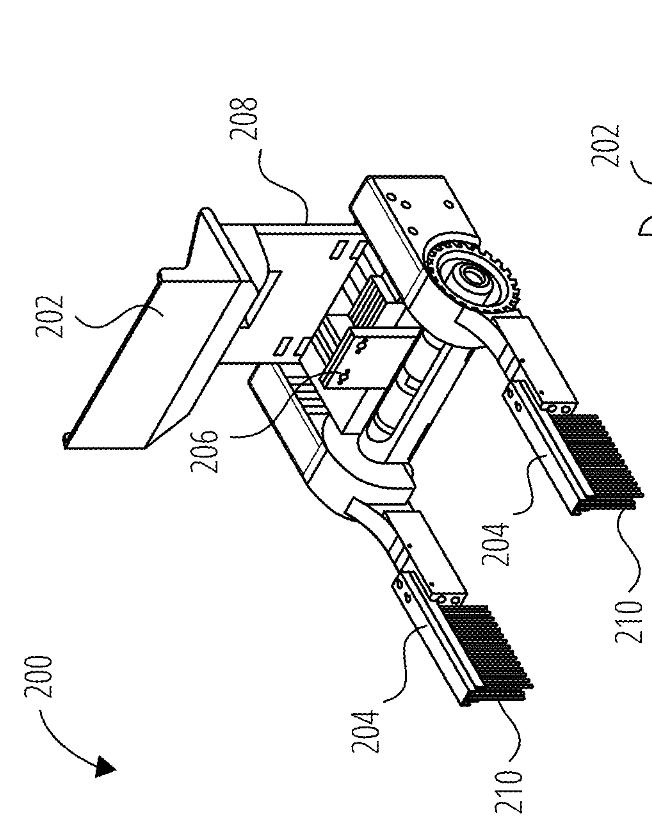
FIG. 2F depicts a perspective view of the robot 200 in accordance with one embodiment, with the bucket in an up (lifted) position and the manipulators in an open configuration.
Figure 2H:
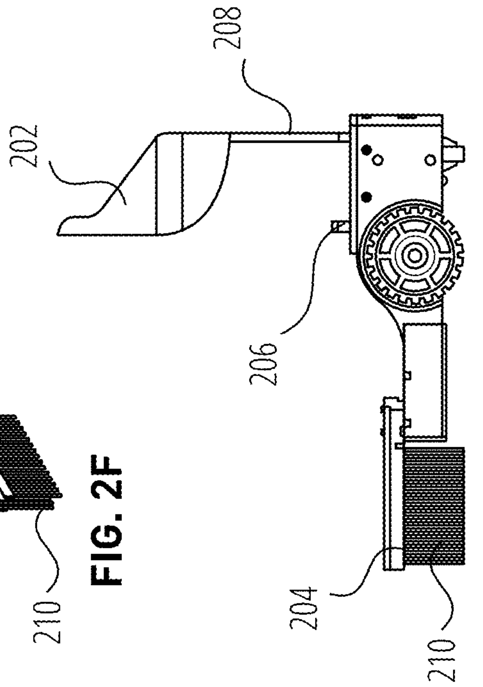
FIG. 2H depicts a side view of the robot 200 in accordance with one embodiment, with the bucket in an up (lifted) position and the manipulators in an open configuration.
Figure 2E:
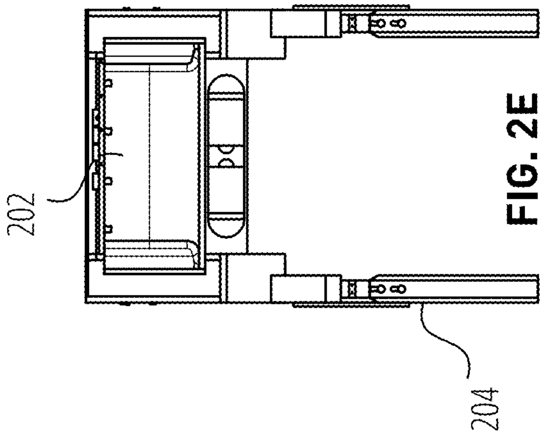
FIG. 2E depicts a top view of the robot 200 in accordance with one embodiment, with the bucket in an up (lifted) position and the manipulators in an open configuration.
Figure 2G:
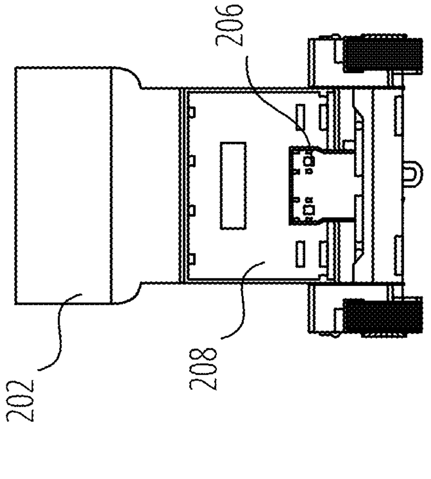
FIG. 2G depicts a front view of the robot 200 in accordance with one embodiment, with the bucket in an up (lifted) position and the manipulators in an open configuration.
Figure 2J:
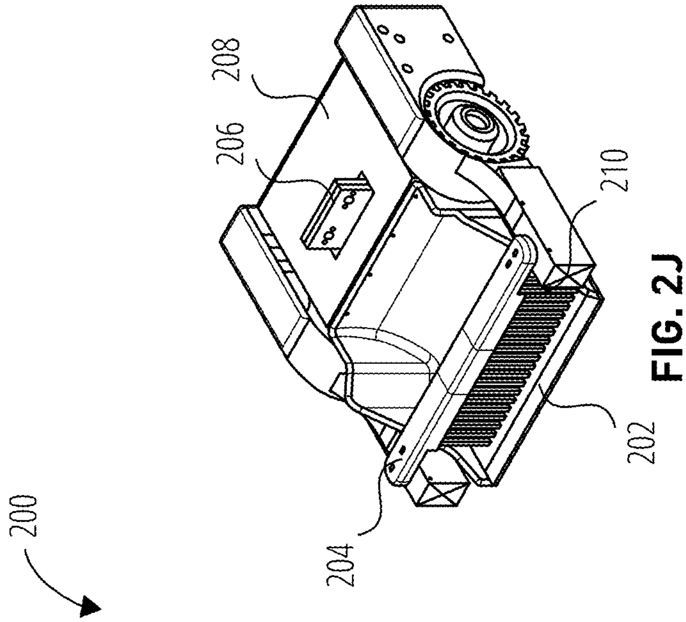
FIG. 2J depicts a perspective view of the robot 200 in accordance with one embodiment, with the bucket in a down position and the manipulators in a closed configuration.
Figure 2L:
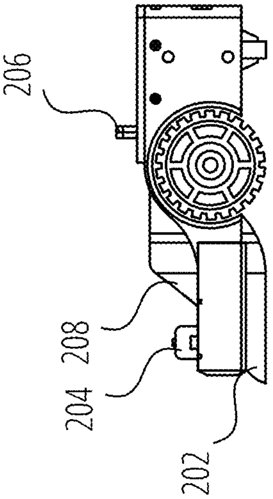
FIG. 2L depicts a side view of the robot 200 in accordance with one embodiment, with the bucket in a down position and the manipulators in a closed configuration.
Figure 2I:
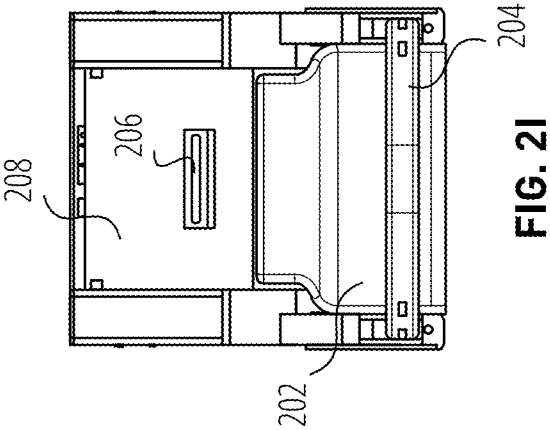
FIG. 2I depicts a top view of the robot 200 in accordance with one embodiment, with the bucket in a down position and the manipulators in a closed configuration.
Figure 2K:
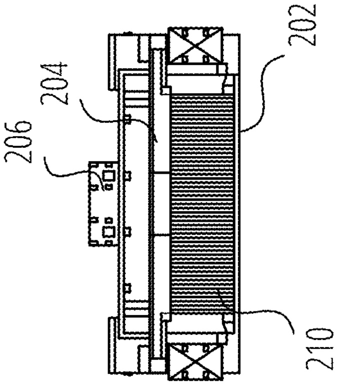
FIG. 2K depicts a front view of the robot 200 in accordance with one embodiment, with the bucket in a down position and the manipulators in a closed configuration.
Figure 3:
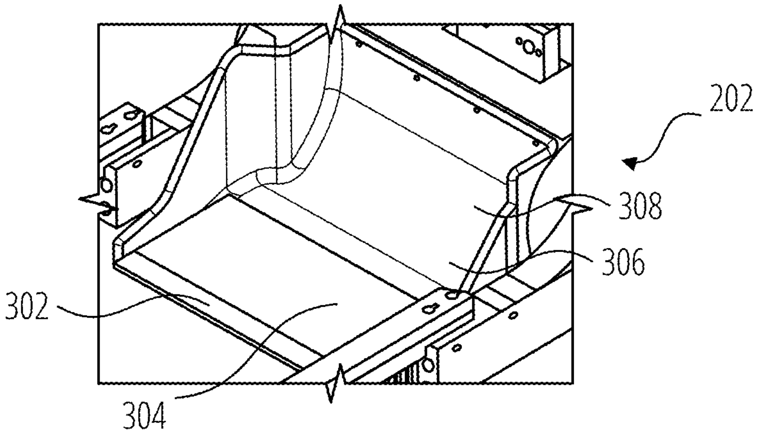
FIG. 3 illustrates an aspect of the subject matter in accordance with one embodiment.

Embodiments of a robotic system are disclosed that operate a robot to navigate an environment using cameras to map the type, size and location of toys, clothing, obstacles and other objects. The robot comprises a neural network to determine the type, size and location of objects based on images from left/right stereo cameras. For each category of object with a corresponding container, the robot chooses a specific object to pick up in that category, performs path planning and navigates to a point adjacent and facing the target object. Actuated pusher arms move other objects out of the way and push the target object onto the front bucket to be carried. The front bucket tilts up slightly and, optionally, actuated pusher arms may close in front to keep objects in place while the robot navigates to the next location in the planned path. This process repeats, picking up additional objects of the same category. Once the bucket is full the robot performs additional path planning and drives itself to be adjacent to the container for that category. The robot then navigates to a container, aligns with a side of the container, lifts the bucket to elevate the target objects up and over the edge of the container.

The robotic system may be utilized for automatic organization of surfaces where items left on the surface are binned automatically into containers on a regular schedule. In one specific embodiment, the system may be utilized to automatically neaten a children's play area (e.g., in a home, school, or business) where toys and/or other items are automatically returned to containers specific to different types of objects, after the children are done playing. In other specific embodiments, the system may be utilized to automatically pick clothing up off the floor and organizing the clothing into laundry basket(s) for washing, or to automatically picking up garbage off the floor and place it into a garbage bin or recycling bin(s), e.g., by type (plastic, cardboard, glass). Generally the system may be deployed to efficiently pick up a wide variety of different objects from surfaces and may learn to pick up new types of objects.

In some embodiments the system may include a robotic arm to reach and grasp elevated objects and move them down to the bucket. A companion "portable elevator" robot may also be utilized in some embodiments to could lift the main robot up onto countertops, tables, or other elevated surfaces, and then lower it back down onto the floor. Some embodiments may utilize an up/down vertical lift (e.g., a scissor lift) to change the height of the bucket when dropping items into a container, shelf, or other tall or elevated location.

Another variation utilizes an up/down vertical lift built into the robot (e.g., a scissor lift or a telescoping lift) that lifts both the bucket and the actuator arms to countertop or table height in order to pick up objects off the countertop or table.

Some embodiments may utilize one or more of the following components:

- left/right rotating brushes on the actuator arms the push objects onto the bucket;
- an actuated gripper that grabs objects and moves them onto the bucket;
- a rotating wheel with flaps that push objects onto the bucket from above;
- one servo to lift the front bucket up into the air and another separate servo that dumps it forwards to dump into a container;
- a variation on a scissor lift that lifts the bucket up and gradually dumps it backwards as it gains height;
- ramps on the container and the front bucket on a hinge so that the robot just pushes items up the ramp and dumps the items into the container with gravity at the top of the ramp;
- a storage bin on the robot for additional carrying capacity. Target objects are pushed up a ramp into the storage bin instead of using a front bucket. The storage bin tilts up and back like a dump truck to drop items into a bin.

Embodiments of a robotic system are disclosed that operate a decluttering robot in conjunction with an augmented reality robotic interface presented to a user as an application. The decluttering robot may navigate an environment using cameras to map the type, size and location of toys, clothing, obstacle and other objects. The robot may comprise a neural network to determine the type, size and location of objects based on input from a sensing system, such as images from left/right stereo cameras. The robot may choose a specific object to pick up, perform path planning, and navigate to a point adjacent and facing the target object. Actuated grabber pad arms may move other objects out of the way and maneuver grabber pads to move the target object onto a bucket to be carried. The bucket may tilt up slightly and grabber pads close in front to keep objects in place while the robot navigates to the next location in the planned path, such as the deposition destination.

In some embodiments the system may include a robotic arm to reach and grasp elevated objects and move them down to the bucket. A companion "portable elevator" robot may also be utilized in some embodiments to lift the main robot up onto countertops, tables, or other elevated surfaces, and then lower it back down onto the floor. Some embodiments may utilize an up/down vertical lift (e.g., a scissor lift) to change the height of the bucket when dropping items into a container, shelf, or other tall or elevated location.

Some embodiments may also utilize one or more of the following components:

- left/right rotating brushes on the actuator arms the push objects onto the bucket;
- an actuated gripper that grabs objects and moves them onto the bucket;
- a rotating wheel with flaps that push objects onto the bucket from above;
- one servo to lift the front bucket up into the air and another separate servo that dumps it forwards to dump into a container;
- a variation on a scissor lift that lifts the bucket up and gradually dumps it backwards as it gains height;
- ramps on the container and the front bucket on a hinge so that the robot just pushes items up the ramp and dumps the items into the container with gravity at the top of the ramp;

a storage bin on the robot for additional carrying capacity. Target objects are pushed up a ramp into the storage bin instead of using a front bucket. The storage bin tilts up and back like a dump truck to drop items into a bin.

The robotic system may be utilized for automatic organization of surfaces where items left on the surface are binned automatically into containers on a regular schedule. In one specific embodiment, the system may be utilized to automatically neaten a children's play area (e.g., in a home, school, or business) where toys and/or other items are automatically returned to containers specific to different types of objects, after the children are done playing. In other specific embodiments, the system may be utilized to automatically pick clothing up off the floor and organize the clothing into laundry basket(s) for washing, or to automatically pick up garbage off the floor and place it into a garbage bin or recycling bin(s), e.g., by type (plastic, cardboard, glass). Generally the system may be deployed to efficiently pick up a wide variety of different objects from surfaces and may learn to pick up new types of objects.

The disclosed solution is a method for interacting with a decluttering robot using augmented reality to communicate the following information with a user:

- Category/type of each object to be picked up
- How objects will be organized by type into bins or elsewhere
- What objects will be picked up next
- Problematic objects that the robot can't move (e.g., too large, heavy, messy, dangerous, or fragile)
- Obstacles that are blocking the robot's path The decluttering robot may use a combination of camera, lidar and other sensors to maintain a global area map of the environment and to localize itself within that. Additionally, the decluttering robot may perform object detection and object classification and may generate visual re-identification fingerprints for each object.

The robot may determine the relative distance and angle to each object. The distance and angle may then be used to localize objects on the global area map. The global area map may then be transmitted wirelessly to the application along with object information. The application may be installed on a user's mobile device, a display mounted on the robot, or some other device providing a convenient display and ability to accept user input.

A camera frame may be captured using the mobile device's camera. The augmented reality robotic interface application may then perform object detection and object classification, and may generate visual re-identification fingerprints for each object. The ground plane may also be detected in the camera frame. The smartphone may then be localized on the global area map using a combination of the ground plane, object types, and re-identification fingerprints. Objects may then be re-identified using their type, location and re-identification fingerprints.

Information may then be overlayed on top of the camera frame showing object types and user indicators that ask a user for assistance. Users may be thanked if they help with tasks (e.g., moving obstacles or putting away large objects). Users may also click on objects and give the robot instructions such as changing an object's type or changing what to pick up next.

The disclosed algorithm improves upon conventional use of augmented reality deployed as an application in a smart device or mobile device, such as a smart phone or tablet, by providing even casual users of technology with an easy approach to interacting with consumer robotics. The disclosed algorithm allows a mobile device and a decluttering robot to be located in their separate stations within a decluttering area, and to communicate back and forth regarding the same objects detected in the area, regardless of the location and orientation of each device within that environment. In one embodiment, the augmented reality robotic interface may be deployed as an application on a computer or laptop device, a gaming console connected to a television, or some other electronic system capable of presenting visual information to a user, accepting user input, and connecting wirelessly to a decluttering robot such as that described below.

The disclosed solution provides a way to visualize the decluttering robot's understanding of objects in an environment using a mobile device such as a smart phone, then using the mobile device application (the augmented reality robotic interface disclosed) as an interface to allow the robot to request assistance and allow the user to give instructions to the robot on how to tidy.

Rather than needing an advanced background in computer coding to instruct a robot, a user in the consumer market sector may with ease instruct the decluttering robot regarding how they desire detected objects be organized and put away. The decluttering robot may also clearly instruct the user regarding how the user may best assist with tidying, such as how to help put away problematic objects (i.e., objects that are too big, too difficult to pick up, fragile, etc.). In addition to detecting and accounting for the different view and perspective the decluttering robot and the user with their mobile device may have of the decluttering area, the disclosed solution may also take advantage this difference. For example, the decluttering robot may help the user locate objects hidden from the user's view by furniture or other obstructions.

The disclosed interface may visually show the user which objects are to be picked up by the decluttering robot, the type or category detected for each object, and which available bins the objects may be organized into. The user may be able to change object categories such that an object may be placed into a different bin than the default the robot has selected. The robot may use the disclosed algorithm to request assistance from the user to tidy objects that the robot finds problematic, such as objects that are too large, are messy, are breakable, present a danger, or are blocking the robot's path in a manner it cannot resolve on its own. The augmented reality robotic interface may allow the user to select which objects are to be picked up next, as well as which objects are to be skipped.

The disclosed augmented reality robotic interface incorporates a novel algorithm for synchronizing a global area map of the decluttering area wirelessly between the robot and the application, and re-identifying objects in the global area map, as well as an algorithm for localizing the mobile device's camera within the global area map. As the augmented reality robotic interface is focused on tidying objects from the floor of a decluttering area, the global area map or global area map used by the decluttering robot may be a two-dimensional map. In augmented reality, the ground plane and object starting locations may be detected along with the object categories and re-identification fingerprints. This information may be used to localize the mobile device on the global area map.

In one embodiment, the augmented reality robotic interface may be used to gamify tidying tasks. The application may, for example, show objects for the user to put away and those the robot will put away, and make it a contest to see which will tidy up their objects first. In one embodiment, the augmented reality robotic interface may be used to ask the decluttering robot to fetch a specific item and put it away or bring it to the user. For example, the decluttering robot could be asked to bring the user a television remote control. In one embodiment, the augmented reality robotic interface may be used in the absence of a decluttering robot to assist a user in organizing objects in their home.

In one embodiment, the augmented reality robotic interface may be deployed on the decluttering robot itself, eliminating the necessity of a separate mobile device. The robot may incorporate speakers and may provide audio messages and alerts to communicate information such as object categories, intended pickup order, problematic objects, etc. The decluttering robot may further include microphones and voice recognition capabilities that allow it to accept audible commands from the user. In one embodiment, the decluttering robot may be configured with a touch screen that may display the global area map and objects and accept user input. The decluttering robot may include visual indicators that change colors based on the type of object it has picked up. The robot may include a pointing feature, such as a colored laser, allowing it to indicate a particular object in conjunction with an audio message.

In one embodiment, the mobile device may be capable of mapping the decluttering area and transmitting that information to the decluttering robot. In this manner, the mobile device may update the global area map of the environment with areas the robot has not yet explored. The augmented reality robotic interface may map the decluttering area and objects to a view based on the mobile device's camera frame in one embodiment and may in another embodiment display the global area map in a top-down two-dimensional view. In another embodiment, the map may be displayed from the robot's ground-level point of view, allowing the user to see objects underneath furniture or otherwise obstructed from their mobile device's camera frame.

FIG. 1 depicts a robotics system 100 in one embodiment. The robotics system 100 receives inputs from one or more sensors 102 and one or more cameras 104 and provides these inputs for processing by localization logic 106, mapping logic 108, and perception logic 110. Outputs of the processing logic are provided to the robotics system 100 path planner 112, pick-up planner 114, and motion controller 116, which in turn drives the system's motor and servo controller 118.

One or more of the localization logic 106, mapping logic 108, and perception logic 110 may be located and/or executed on a mobile robot, or may be executed in a computing device that communicates wirelessly with the robot, such as a cell phone, laptop computer, tablet computer, or desktop computer. In some embodiments, one or more of the localization logic 106, mapping logic 108, and perception logic 110 may be located and/or executed in the "cloud", i.e., on computer systems coupled to the robot via the Internet or other network.

The perception logic 110 is engaged by an image segmentation activation 144 signal, and utilizes any one or more of well-known image segmentation and objection recognition algorithms to detect objects in the field of view of the camera 104. The perception logic 110 may also provide calibration and objects 120 signals for mapping purposes. The localization logic 106 uses any one or more of well-known algorithms to localize the mobile robot in its environment. The localization logic 106 outputs a local to global transform 122 reference frame transformation and the mapping logic 108 combines this with the calibration and objects 120 signals to generate an environment map 124 for the pick-up planner 114, and object tracking 126 signals for the path planner 112.

In addition to the object tracking 126 signals from the mapping logic 108, the path planner 112 also utilizes a current state 128 of the system from the system state settings 130, synchronization signals 132 from the pick-up planner 114, and movement feedback 134 from the motion controller 116. The path planner 112 transforms these inputs into navigation waypoints 136 that drive the motion controller 116. The pick-up planner 114 transforms local perception with image segmentation 138 inputs from the perception logic 110, the 124 from the mapping logic 108, and synchronization signals 132 from the path planner 112 into manipulation actions 140 (e.g., of robotic graspers, buckets) to the motion controller 116. Embodiments of algorithms utilized by the path planner 112 and pick-up planner 114 are described in more detail below.

In one embodiment simultaneous localization and mapping (SLAM) algorithms may be utilized to generate the global map and localize the robot on the map simultaneously. A number of SLAM algorithms are known in the art and commercially available.

The motion controller 116 transforms the navigation waypoints 136, manipulation actions 140, and local perception with image segmentation 138 signals to target movement 142 signals to the motor and servo controller 118.

FIG. 2A-FIG. 2L depict a robot 200 in various configurations of a lift bucket and actuator arms. The robot 200 may be configured to operate according to the algorithms disclosed herein. The robot 200 may utilize a front bucket (bucket 202) that makes a tight seal with the surface, and pusher arms (manipulator actuator arms 204) are able to push items on the surface and urge the items onto the bucket 202 for carrying them. (The terms 'bucket' and 'shovel' are used interchangeably herein to refer to the object containment vessel of the robot). For example, this enables the robot to pick up several small items such as Legos or marbles at the same time without dropping them.

The robot 200 may utilize stereo cameras 206 along with a machine learning/neural network software architecture (e.g., semi-supervised or supervised convolutional neural network) to efficiently classify the type, size and location of different objects on a map of the environment. The robot 200 may utilize both forward and backward facing cameras 206 to scan both in front and behind it. The bucket 202 may rotate up and backwards on a single actuated arm (bucket actuator arm 208) to enable a single servo/motor to both lift the bucket 202 slightly off the floor for carrying objects and then using the same servo/motor to lift the bucket 202 up above the top of the container for dumping. This approach keeps the height of the robot 200 low for picking up items underneath (e.g.) chairs or couches, but still enables it to lift and dump items into containers that are taller.

The manipulator actuator arms 204 may comprise manipulator brushes 210 with bristles set at a slight angle (relative to the surface) which enables them to access under flat objects (e.g. a flat Lego sheet or puzzle pieces) and tumble/roll them onto the pickup bucket 202. The use of angled manipulator brushes 210 may also facilitate the uptake of high friction objects such as rubber balls or toys. Providing horizontal pressure while also getting slightly underneath objects with the manipulator actuator arm 204 is helpful to picking up items while preventing jamming.

In one embodiment, two motors are employed to move the robot 200 around its environment, two servos are utilized on the left/right manipulator actuator arms 204, and one servo is utilized for lifting the bucket 202 up and backwards to dump items into containers. Using fewer motors/servos reduces cost, reduces weight, and improves the reliability of the robot 200. The use of the bucket 202 with a servo enables the bucket 202 to be tilted up and back slightly so that it is raised off the ground. This enables several items to be carried at the same time while navigating around obstacles and over bumps without dropping them. The manipulator actuator arm 204 may form a wedge "V" shape in front of the robot 200 to enable navigation through a messy/cluttered environment with items being pushed to the left/right as it drives, like a split-plow. This enables the robot 200 to drive through a messy/cluttered environment without getting stuck or prevents items from going under the robot 200 where they may get wrapped around the wheels or other drive mechanism. Furthermore, this enables unwanted objects from getting onto the bucket 202.

The robot 200 may navigate the environment using the manipulator actuator arm 204 to organize items on the floor into piles before attempting to pick up any items into the bucket 202. This takes advantage of the available floor space in order to organize items by category. The manipulator actuator arm 204 are a multi-purpose tool in that they can both push target objects onto the bucket 202 for pick up, but also organize items into piles on the floor.

In some embodiments, may also be a "fast cleanup mode" during which the robot 200 indiscriminately picks up objects as quickly as it can and then puts them into a single container—or even against the wall. In this mode, the robot 200 may bypass many of the actions and states described later, such as organizing, waypoint path planning, binning, etc.

Containers (depicted in other figures) maybe disposed in the environment, comprising labels with categories that are both machine readable and human readable at the same time. Replacing the label on a container changes the type of objects that will be organized into it. This enables the robot 200 to work alongside humans to help clean up a messy/cluttered room. It also facilitates changing categories of objects for organization.

The bucket 202 may comprise a unique shape (described now relative to the bucket 202 oriented flat on the floor) that enables it to both maintain a tight seal 302 against the floor so that small objects can be pushed onto it, and an adjacent convexity 304 and concavity 306 so that objects are retained in the bucket 202 and round objects don't roll out, where the concavity 306 transitions to an extended back surface 308 (that may be curved) formed such that it functions as a slide and funnel when inverted. The extended back surface 308 may also be angled toward the back of the robot 200 (away from the bucket 202) to reduce the overall height of the robot 200.

The bucket 202 may utilize a hinge mechanism that enables it to tilt forwards and dump out unwanted items as the robot drives backwards. This may be driven by the same servo that enables the bucket 202 to be lifted up and back. This mechanism may be utilized to drop an item back onto the floor if it is picked up accidentally. The collection members (e.g., manipulator brushes 210) on the manipulator actuator arms 204 may utilize compressible foam pads that enable both manipulator actuator arms 204 to work together to grip and hold objects in front of the robot 200. This provides a useful way to manipulate a specific object, e.g., for organizing categories of objects into clusters or for clearing a path. For example, a target object may be moved to a less cluttered area before it is picked up, or an object may be moved into a pile with similar items on the floor.

Users may configure, via an application on a mobile phone for example, custom categories of objects in order to organize previously unlearned object types. For example users may perform this configuration using an app on their phone to create a custom label and then taking photos of the custom objects they would like organized into a container with that label.

The robot 200 in particular embodiments may comprise some or all of the following components:

A plastic robot chassis that is 3D printed (or injection molded).

Two brushless planetary gear DC motors for driving the robot's wheels.

Two small servos for moving the left/right pusher arms.

One medium servo for lifting the bucket up and backwards.

Brush strips along with 3D printed (or injection molded) mounts for the pusher arms.

Front bucket that is 3D printed (or injection molded).

Two front wheels along with mounts, ball bearings, metal shafts and coupling connectors.

Two back caster wheels which can swivel to allow the robot to turn freely.

Four RGB digital cameras for gathering visual data.

LED lights used to give the robot light in a dark room.

Microcontroller (E.g. Jetson Nano) with embedded GPUs for running machine learning algorithms.

24V lithium ion battery for powering the robot.

Custom circuit board which includes battery charger circuit, can do power management for sensors and includes an inertial measurement unit.

A rigid metal beam along with a 3D printed (or injection molded) mount and ball bearings that can be lifted by the servo to lift the front bucket up and backwards.

Infrared sensors mounted at the front of the robot to detect stairs or a potential drop.

The robot chassis includes mounts for the motors, servos, battery, microcontroller and other components.

Figure 4A:
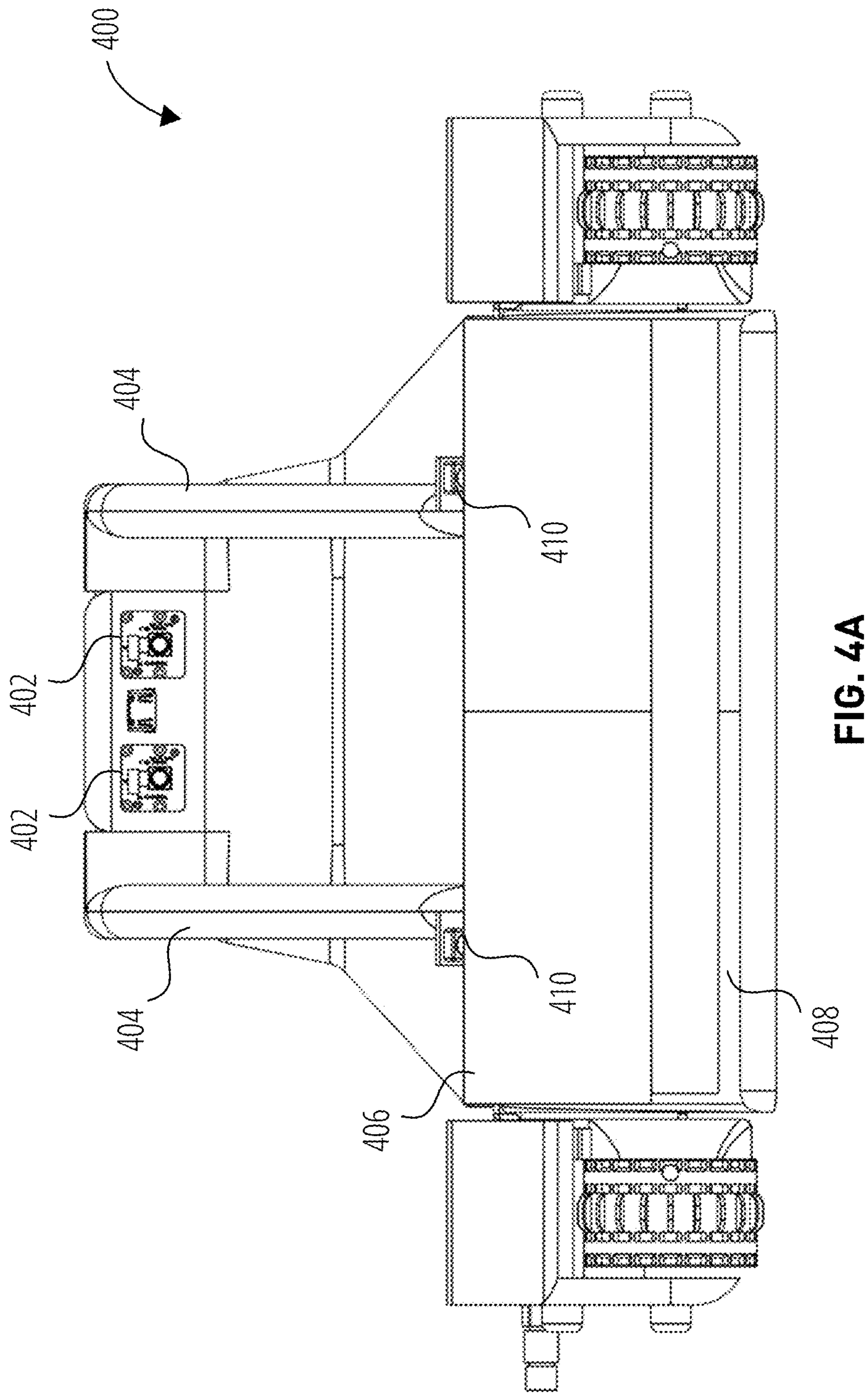
FIG. 4A depicts a front view of a robot 400 in another embodiment.
Figure 4B:
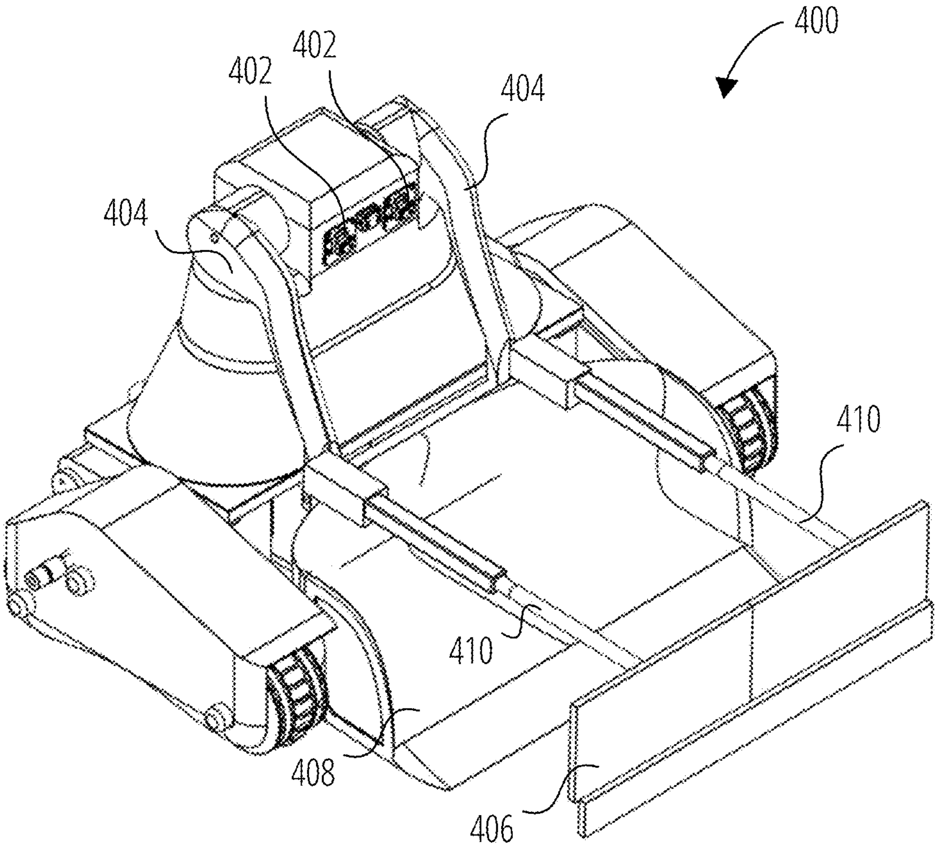
FIG. 4B depicts the robot 400 in perspective view.
Figure 4C:
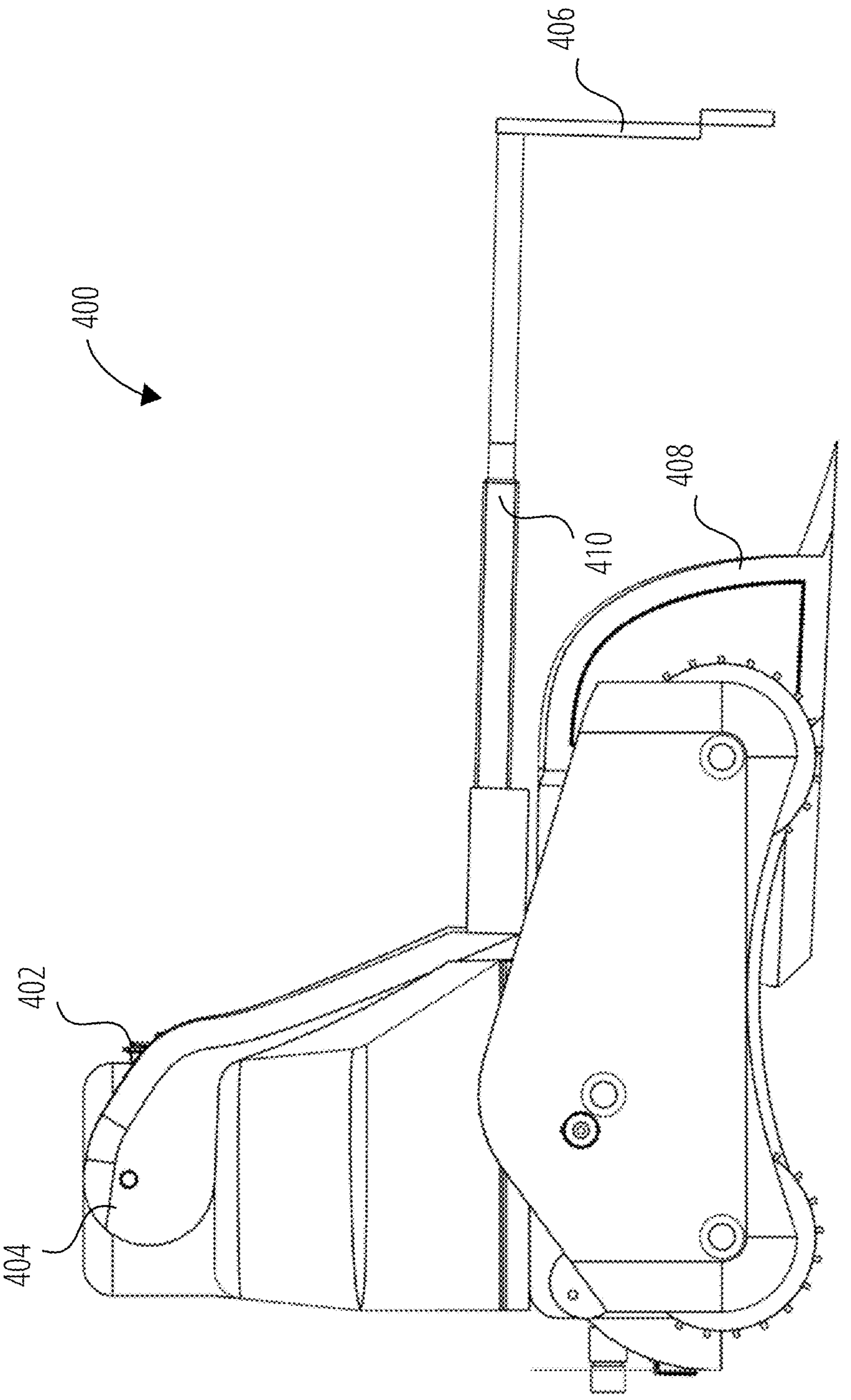
FIG. 4C depicts the robot 400 in side view.
Figure 4D:
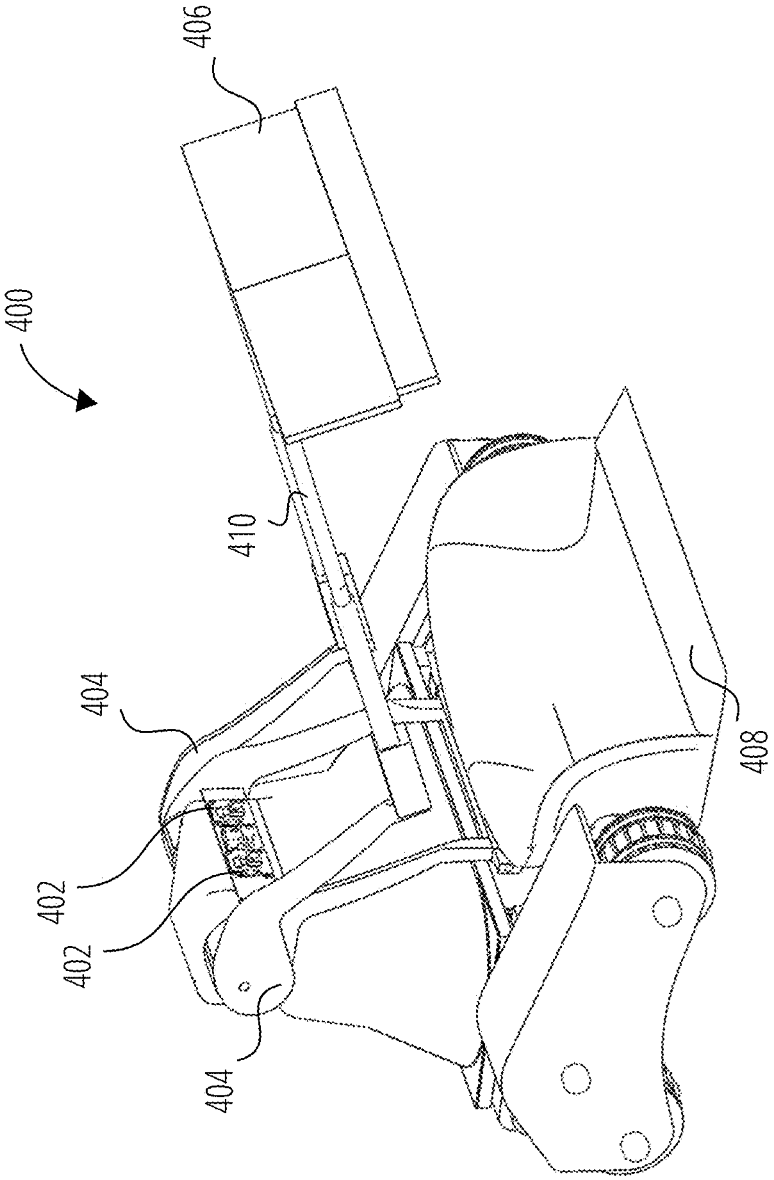
FIG. 4D the robot 400 with the manipulators in a raised orientation.

FIG. 4A-FIG. 4C depict various views of a robot 400 in an alternate embodiment, including cameras 402, lift actuator arm 404, collection member 406, bucket 408, and linear actuators 410. The robot 400 may be configured to operate according to the algorithms disclosed herein.

Figure 5:
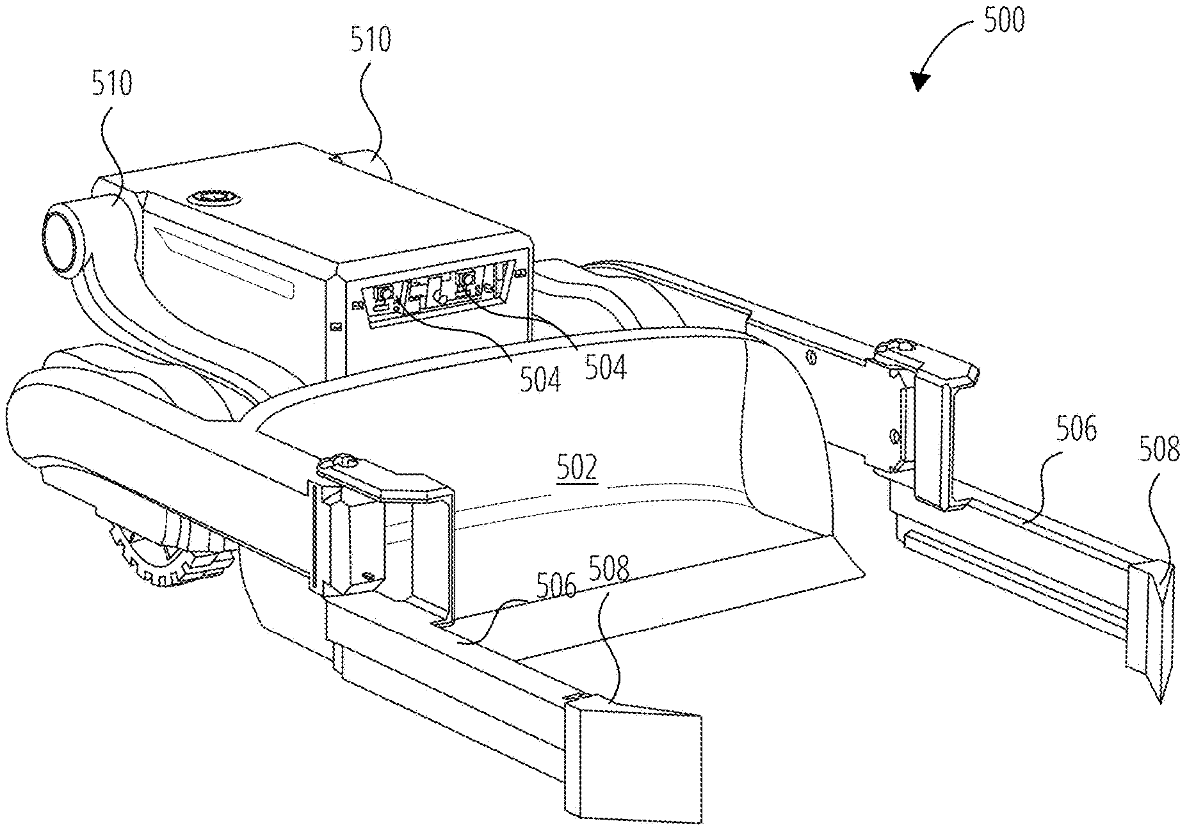
FIG. 5 depicts a robot 500 in accordance with yet another embodiment.
Figures 6A, 6B, 6C, 6D:
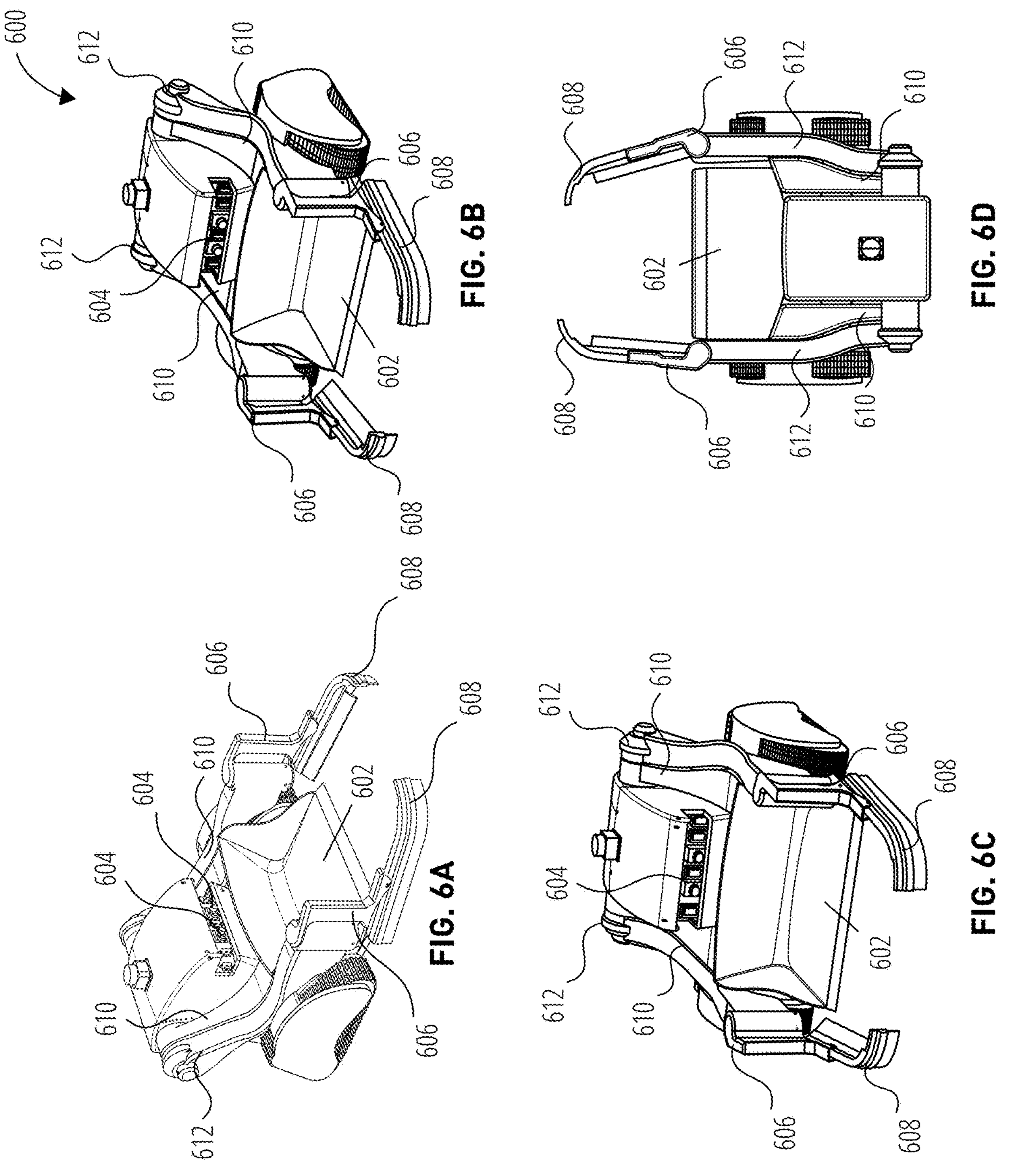
FIG. 6A through FIG. 6D depict a robot 600 in accordance with yet another embodiment.

FIG. 5 depicts a robot 500 in accordance with yet another embodiment, including bucket 502, cameras 504, manipulator actuator arm 506, collection members 508, and bucket actuator arms 510. The robot 500 may be configured to operate according to the algorithms disclosed herein.

FIG. 6A through FIG. 6D depict a robot 600 in accordance with yet another embodiment. The robot 600 comprises a bucket 602, cameras 604, manipulator actuator arms 606, collection members 608, bucket actuator arms 610, and manipulator lift arms 612. The robot 600 may be configured to operate according to the algorithms disclosed herein.

Figure 7A:
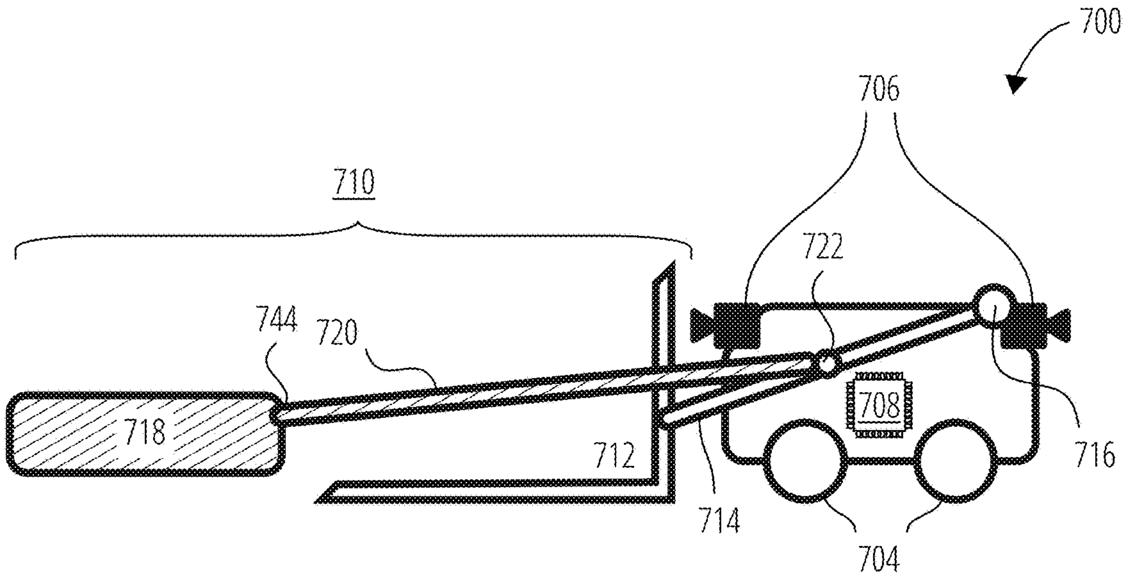
FIG. 7A-FIG. 7D depict aspects of a robot 700 in accordance with one embodiment.
Figure 7B:
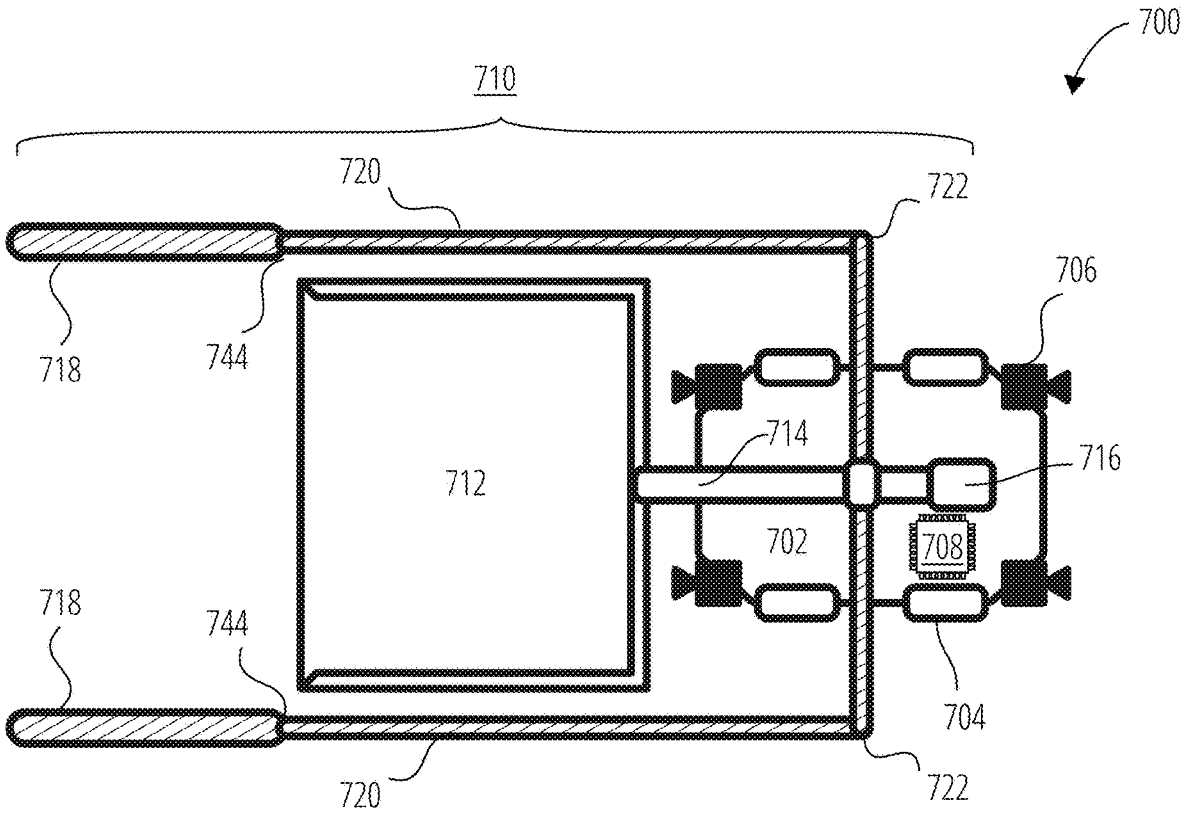
Figure 7C:
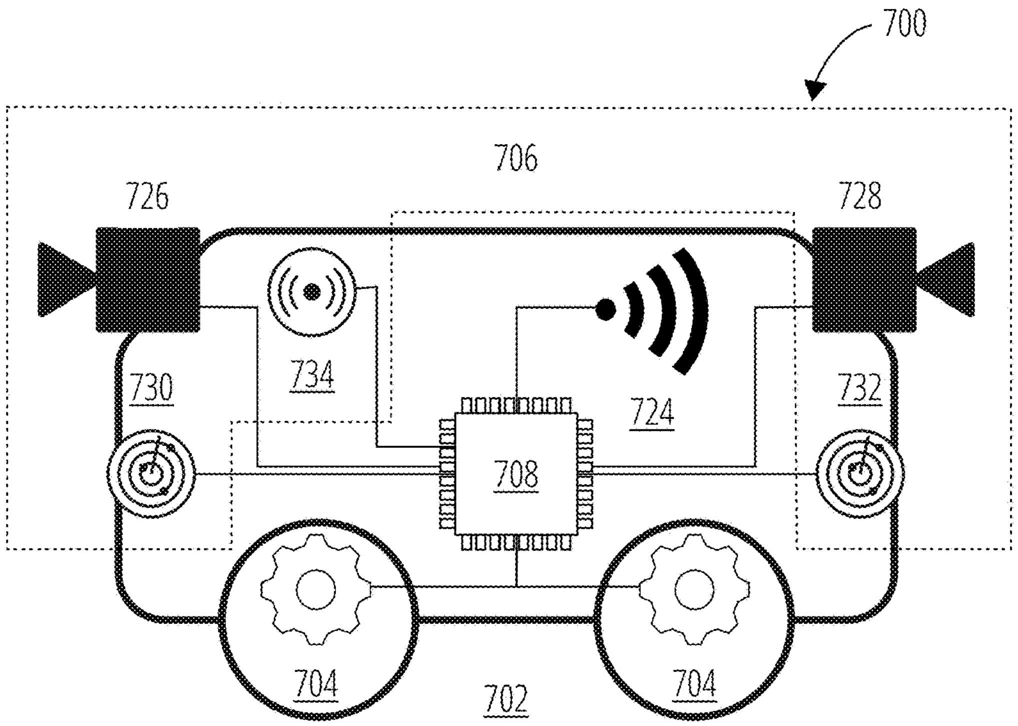
Figure 7D:
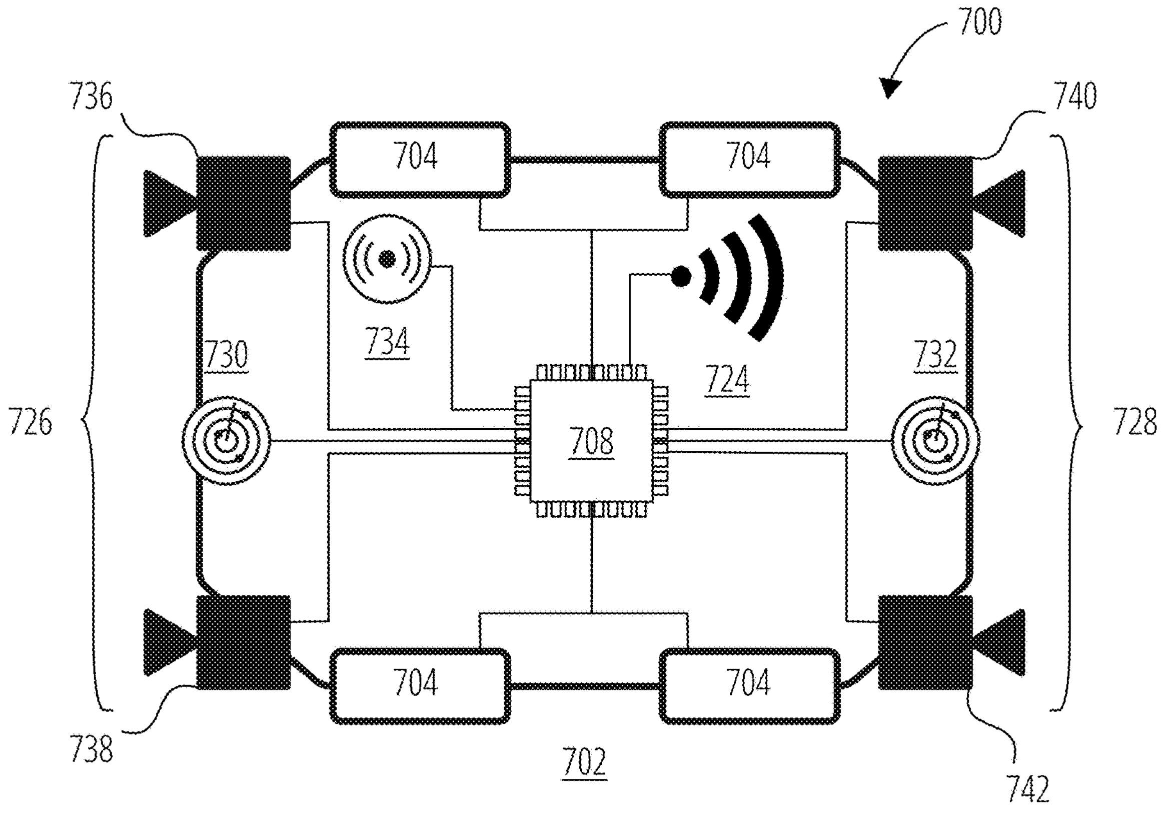

FIG. 7A through FIG. 7D depict additional aspects of a robot 700 in accordance with one embodiment. FIG. 7A illustrates a side view of the robot 700, and FIG. 7B illustrates a top view. The robot 700 may comprises a chassis 702, a mobility system 704, a sensing system 706, a control system 708, and a capture and containment system 710. The capture and containment system 710 may further comprise a bucket 712, a bucket lift arm 714, a bucket lift arm pivot point 716, two manipulator members 718, two manipulator arms 720, and two arm pivot points 722. FIG. 7C and FIG. 7D illustrate a side view and top view of the chassis 702, respectively, along with the general connectivity of components of the sensing system 706, mobility system 704, and communications 724 with the control system 708. The sensing system 706 may further comprise cameras such as the front cameras 726 and rear cameras 728, light detecting and ranging (LIDAR) sensors such as front lidar sensors 730 and rear lidar sensors 732, and inertial measurement unit (IMU) sensors, such as IMU sensors 734. In some embodiments, front cameras 726 may include the front right camera 736 and front left camera 738. In some embodiments, rear cameras 728 may include the rear left camera 740 and rear right camera 742.

The chassis 702 may support and contain the other components of the robot 700. The mobility system 704 may comprise wheels as indicated, as well as caterpillar tracks, conveyor belts, etc., as is well understood in the art. The mobility system 704 may further comprise motors, servos, or other sources of rotational or kinetic energy to impel the robot 700 along its desired paths. Mobility system components may be mounted on the chassis 702 for the purpose of moving the entire decluttering robot without impeding or inhibiting the range of motion needed by the capture and containment system 710. Elements of a sensing system 706, such as cameras, lidar sensors, or other components, may be mounted on the chassis 702 in positions giving the robot 700 clear lines of sight around its environment in at least some configurations of the chassis 702, bucket 712, manipulator member 718, and manipulator arm 720 with respect to each other.

The chassis 702 may house and protect the control system 708, comprising in some embodiments, a processor, memory, and connections to the mobility system 704, sensing system 706, capture and containment system 710, and communications 724. The chassis 702 may contain other electronic components such as batteries, wireless communication devices, etc., as is well understood in the art of robotics. These components may function as a robotic control system 2400, described in greater detail with respect to FIG. 24.

The capture and containment system 710 may comprise a bucket 712, a bucket lift arm 714, a bucket lift arm pivot point 716, a manipulator member 718, a manipulator arm 720, a manipulator pivot point 744, and an arm pivot point 722. The geometry and of the bucket 712 and the disposition of the manipulator members 718 and manipulator arms 720 with respect to the bucket 712 may describe a containment area in which objects may be securely carried. Servos at the bucket lift arm pivot point 716, manipulator pivot points 744, and arm pivot points 722 may be used to adjust the disposition of the bucket 712, manipulator members 718, and manipulator arms 720 between fully lowered bucket and grabber positions and raised bucket and grabber positions.

In some embodiments, gripping surfaces may be configured on the sides of the manipulator members 718 facing in toward objects to be lifted. These gripping surfaces may provide cushion, grit, elasticity, or some other feature that increases friction between the manipulator members 718 and objects to be captured and contained. In some embodiments, the manipulator members 718 may be configured with sweeping bristles. These sweeping bristles may assist in moving small objects from the floor up onto the bucket 712. In some embodiments, the sweeping bristles may angle down and inward from the manipulator members 718, such that, when the manipulator members 718 sweep objects toward the bucket 712, the sweeping bristles form a ramp, allowing the foremost bristles to slide beneath the object, and direct the object upward toward the manipulator members 718, facilitating capture of the object within the bucket and reducing a tendency of the object to be pressed against the floor, increasing its friction and making it more difficult to move.

Rubber objects are typically more difficult to pick up compared with less clastic objects because they tend to stick and jam. Forward-facing bristles are meant to decrease this friction so that such elastic objects can rotate and thus not jam. An alternative embodiment may utilize low-friction materials such as PTFE (polytetrafluoroethylene) for the gripping surfaces.

Figures 8A, 8B, 8C:
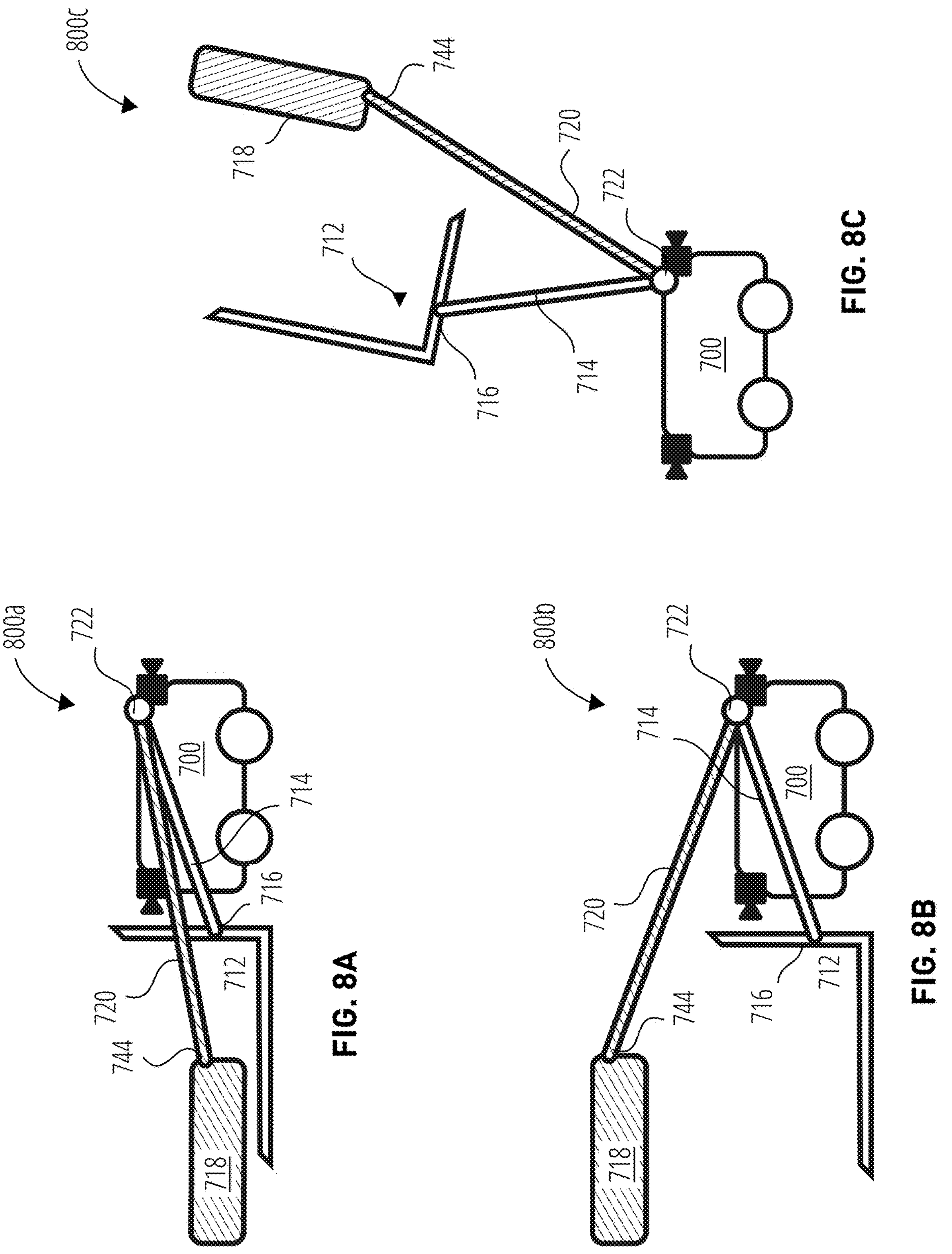
FIG. 8A depicts a lowered bucket position and lowered grabber position **800*a* for the robot 700** in accordance with one embodiment.
FIG. 8B depicts a lowered bucket position and raised grabber position **800*b* for the robot 700** in accordance with one embodiment.
FIG. 8C depicts a raised bucket position and raised grabber position **800*c* for the robot 700** in accordance with one embodiment.

FIG. 8A through FIG. 8C depict a robot 700 such as that introduced with respect to FIG. 7A through FIG. 7D, for which the grabber pad arms may be controlled by a servo at the same point of contact with the chassis as the bucket. The robot 700 may be seen disposed in a lowered bucket position and lowered grabber position 800*a*, a lowered bucket position and raised grabber position 800*b*, and a raised bucket position and raised grabber position 800*c*. This robot 700 may be configured to perform the algorithms disclosed herein.

Figure 9:
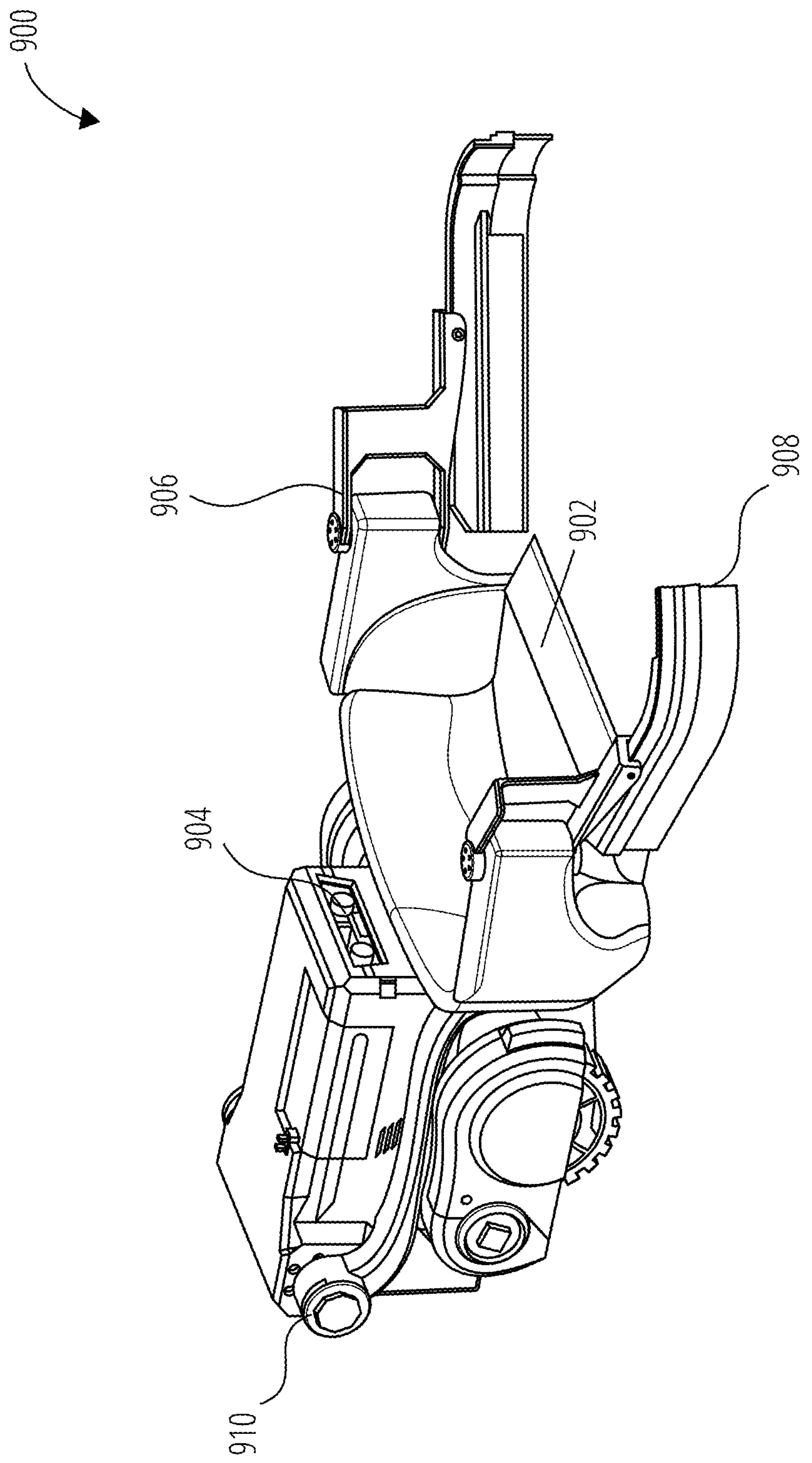
FIG. 9 depicts a robot 900 in accordance with another embodiment.

FIG. 9 depicts a robot 900 in accordance with another embodiment including a bucket 902, bucket actuator arms 910, cameras 904, and manipulator actuator arms 906 for collection members 908, extending from and mounted on the bucket 902.

Figure 10:
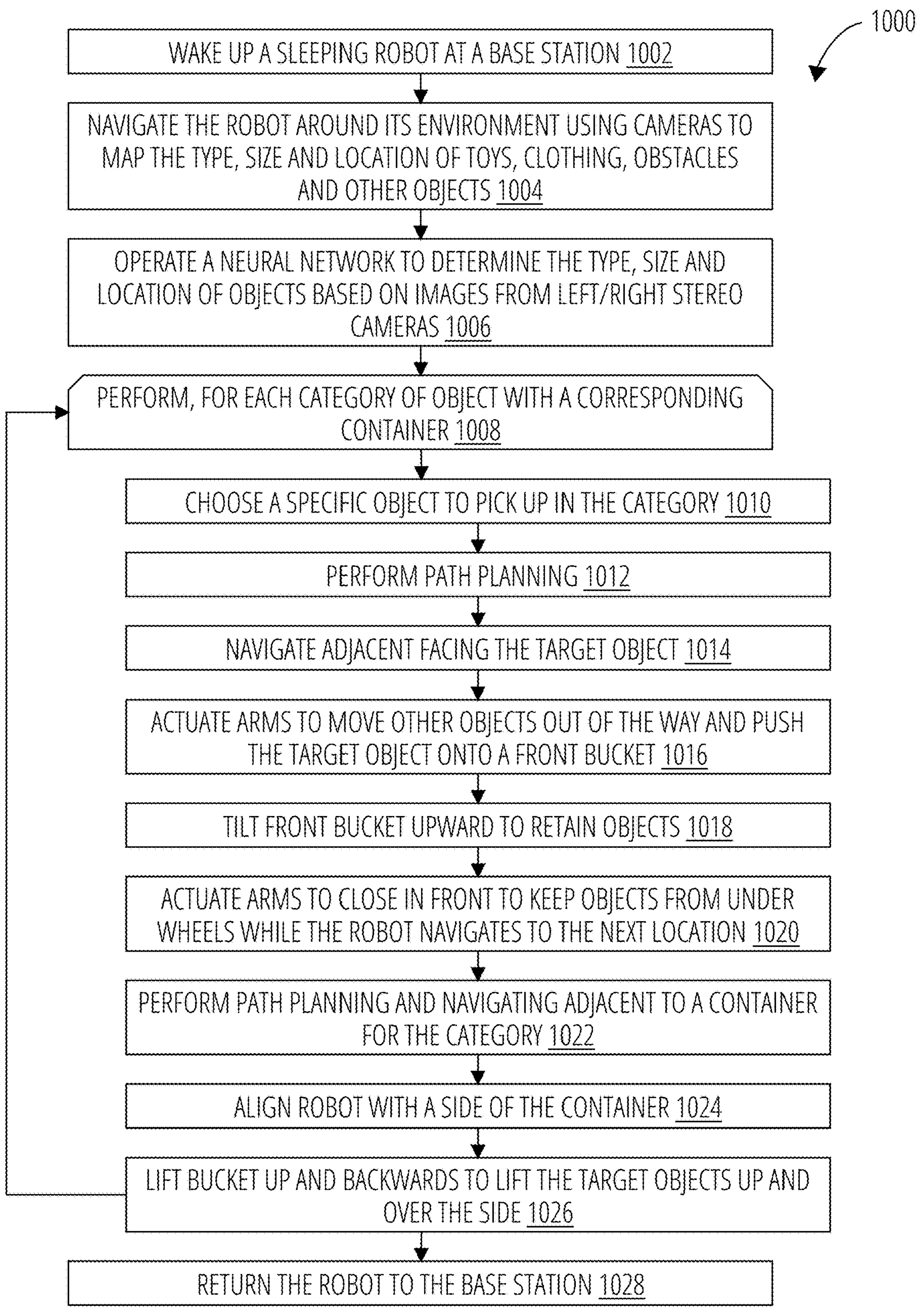
FIG. 10 depicts a robotic process 1000 in accordance with one embodiment.

FIG. 10 depicts a robotic process 1000 in one embodiment. In block 1002, the robotic process 1000 wakes up a sleeping robot at a base station. In block 1004, the robotic process 1000 navigates the robot around its environment using cameras to map the type, size and location of toys, clothing, obstacles and other objects. In block 1006, the robotic process 1000 operates a neural network to determine the type, size and location of objects based on images from left/right stereo cameras. In opening loop block 1008, the robotic process 1000 performs, for each category of object with a corresponding container. In block 1010, the robotic process 1000 chooses a specific object to pick up in the category. In block 1012, the robotic process 1000 performs path planning. In block 1014, the robotic process 1000 navigates adjacent to and facing the target object. In block 1016, the robotic process 1000 actuates arms to move other objects out of the way and push the target object onto a front bucket. In block 1018, the robotic process 1000 tilts the front bucket upward to retain them on the bucket (creating a "bowl" configuration of the bucket). In block 1020, the robotic process 1000 actuates the arms to close in front to keep objects from under the wheels while the robot navigates to the next location. In block 1022, the robotic process 1000 performs path planning and navigating adjacent to a container for the current object category for collection. In block 1024, the robotic process 1000 aligns the robot with a side of the container. In block 1026, the robotic process 1000 lifts the bucket up and backwards to lift the target objects up and over the side of the container. In block 1028, the robotic process 1000 returns the robot to the base station.

In a less sophisticated operating mode, the robot may opportunistically picks up objects in its field of view and drop them into containers, without first creating a global map of the environment. For example, the robot may simply explore until it finds an object to pick up and then explore again until it finds the matching container. This approach may work effectively in single-room environments where there is a limited area to explore.

Figure 11:
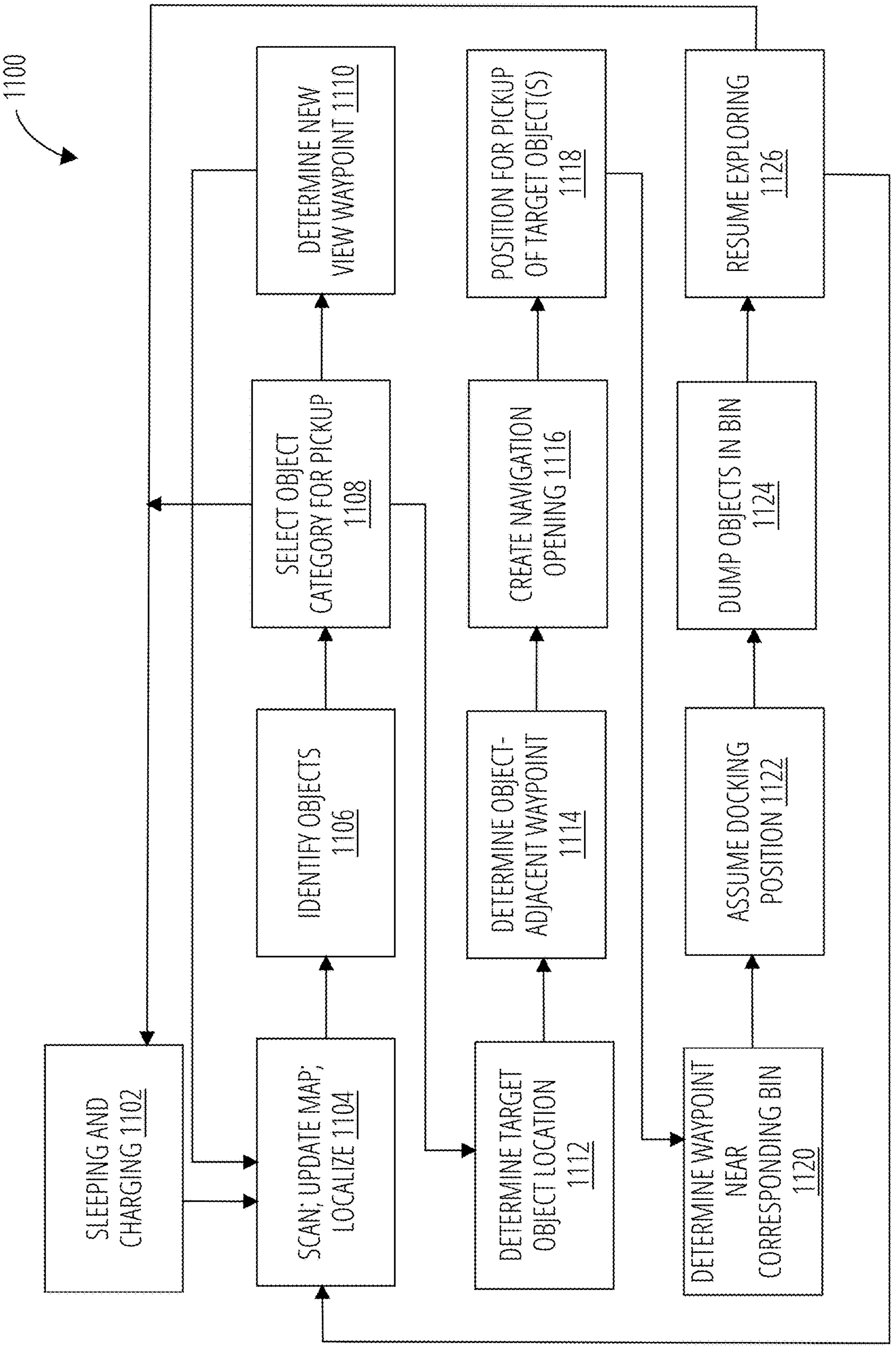
FIG. 11 depicts another robotic process 1100 in accordance with one embodiment.

FIG. 11 also depicts a robotic process 1100 in one embodiment. An illustrative example of the robotic process 1100 is depicted as a graphical sequence in FIG. 13-FIG.

Figure 12:
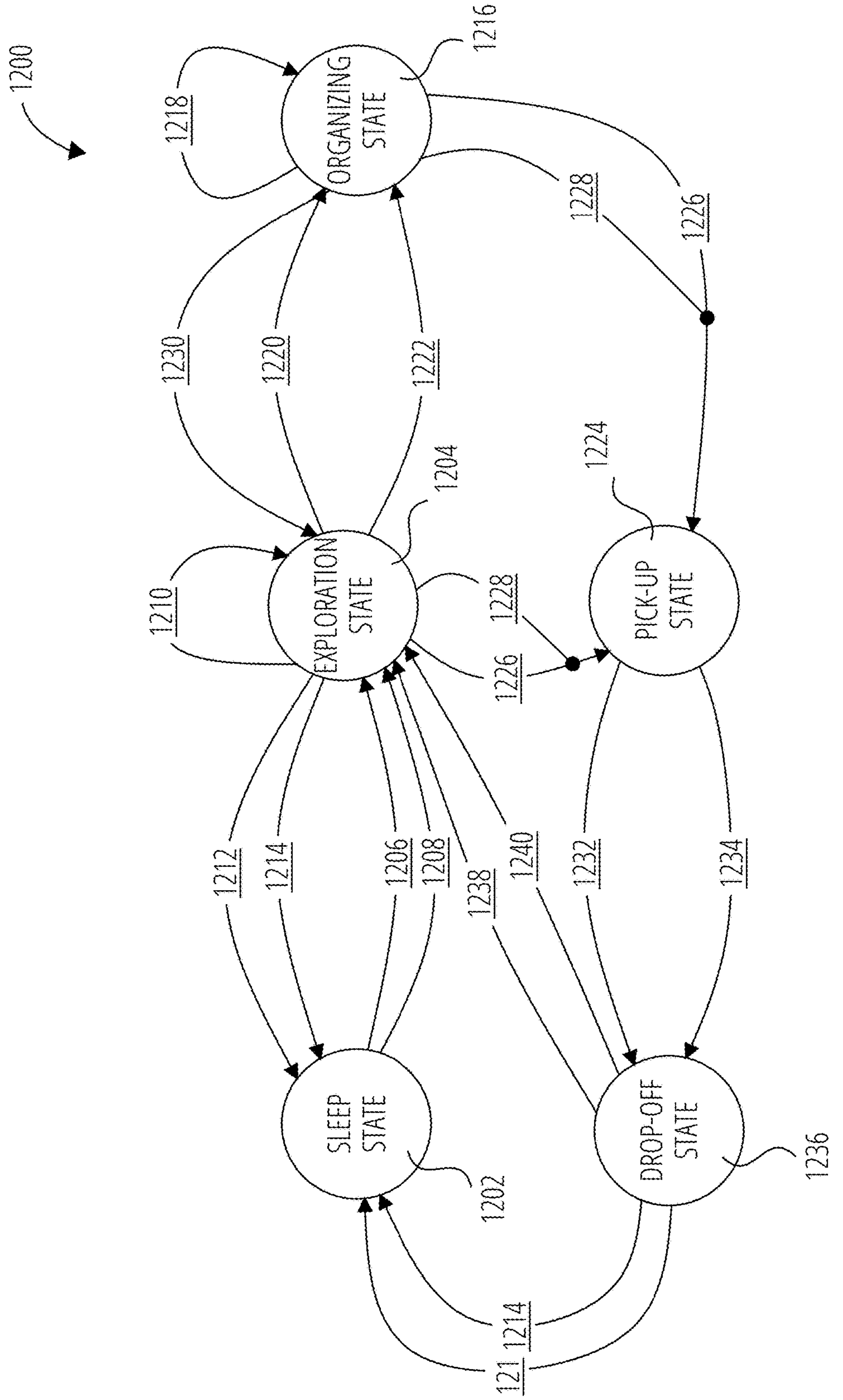
FIG. 12 depicts a state space map 1200 for a robotic system in accordance with one embodiment.

16B, in which the robotic system sequences through an embodiment of a state space map 1200 as depicted in FIG. 12.

Figure 13:
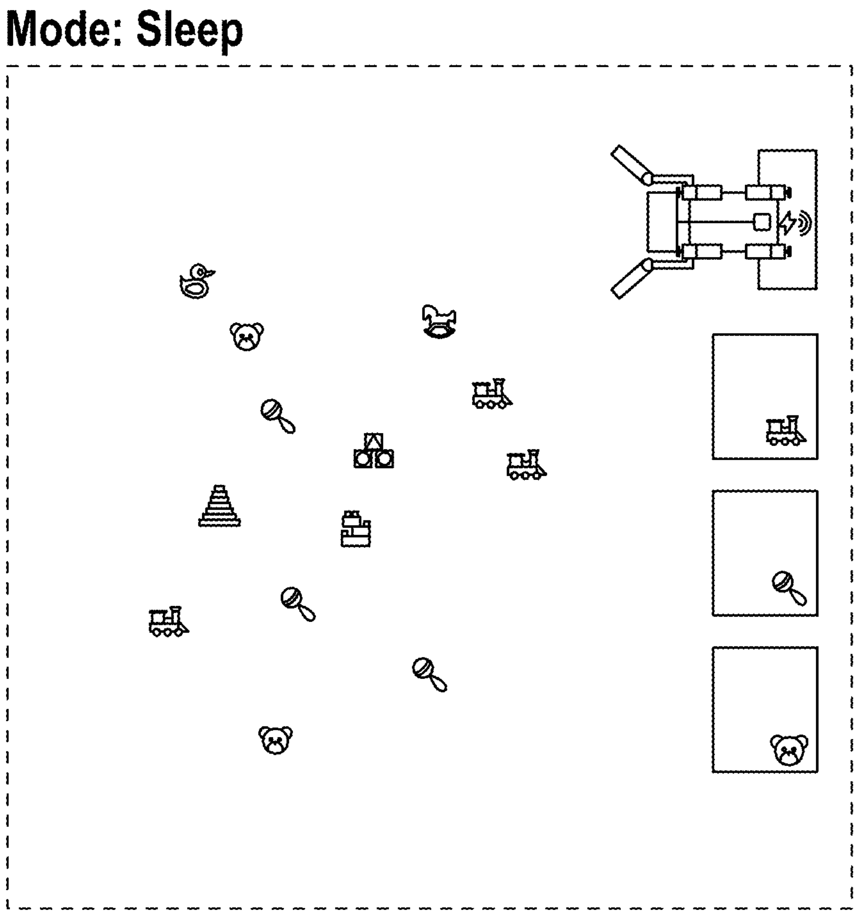
FIG. 13 depicts an example of a robotic system in a sleep mode.
Figure 14A:
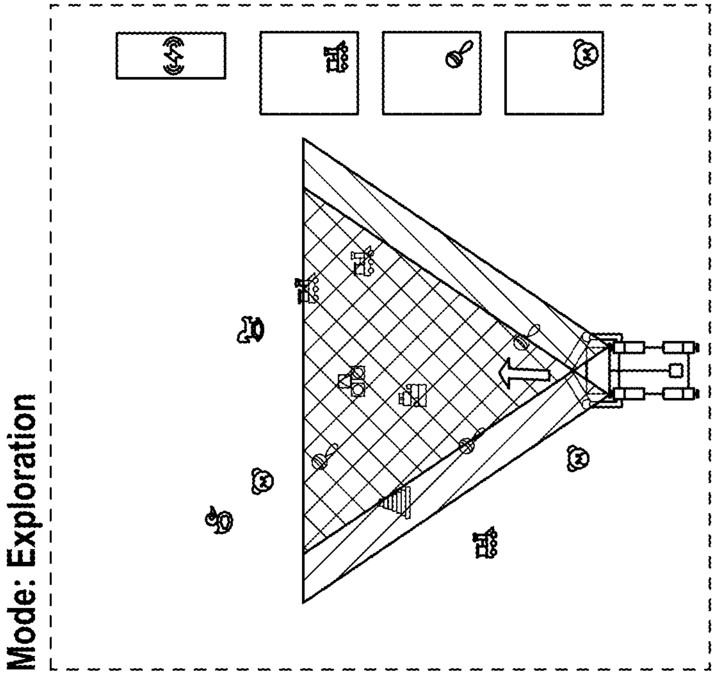
FIG. 14A-FIG. 14B depict an example of a robotic system in an exploration mode.
Figure 14B:
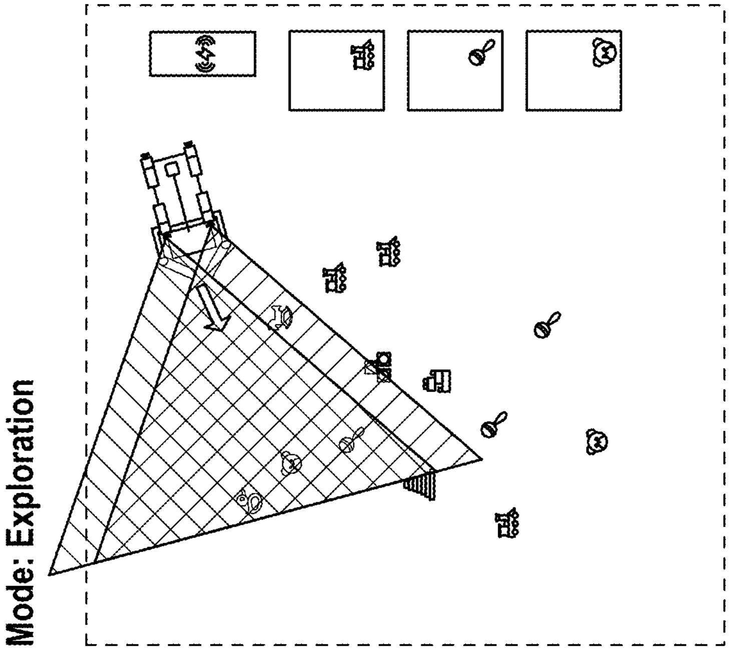

The sequence begins with the robot sleeping (sleep state 1202) and charging at the base station (FIG. 13 and block 1102. The robot is activated, e.g., on a schedule, and enters an exploration mode (environment exploration state 1204, activation action 1206, schedule start time 1208, FIG. 14A, and FIG. 14B). In the environment exploration state 1204, the robot scans the environment using cameras (and other sensors) to update its environmental map and localize its own position on the map (block 1104, explore for configured interval 1210). The robot may transition from the environment exploration state 1204 back to the sleep state 1202 on condition that there are no more objects to pick up 1212, or the battery is low 1214.

From the environment exploration state 1204, the robot may transition to the object organization state 1216, in which it operates to move the items on the floor to organize them by category 1218. This transition may be triggered by the robot determining that objects are too close together on the floor 1220, or determining that the path to one or more objects is obstructed 1222. If none of these triggering conditions is satisfied, the robot may transition from the environment exploration state 1204 directly to the object pick-up state 1224 on condition that the environment map comprises at least one drop-off container for a category of objects 1226, and there are unobstructed items for pickup in the category of the container 1228. Likewise the robot may transition from the object organization state 1216 to the object pick-up state 1224 under these latter conditions. The robot may transition back to the environment exploration state 1204 from the object organization state 1216 on condition that no objects are ready for pick-up 1230.

In the environment exploration state 1204 and/or the object organization state 1216, image data from cameras is processed to identify different objects (block 1106). The robot selects a specific object type/category to pick up, determines a next waypoint to navigate to, and determines a target object and location of type to pick up based on the map of environment (block 1108, block 1110, and block 1112).

Figure 15A:
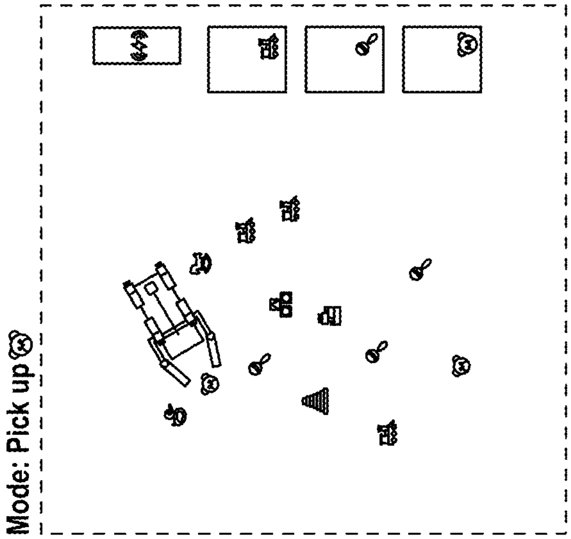
FIG. 15A-FIG. 15F depict an example of a robotic system in a pickup mode.
Figure 15B:
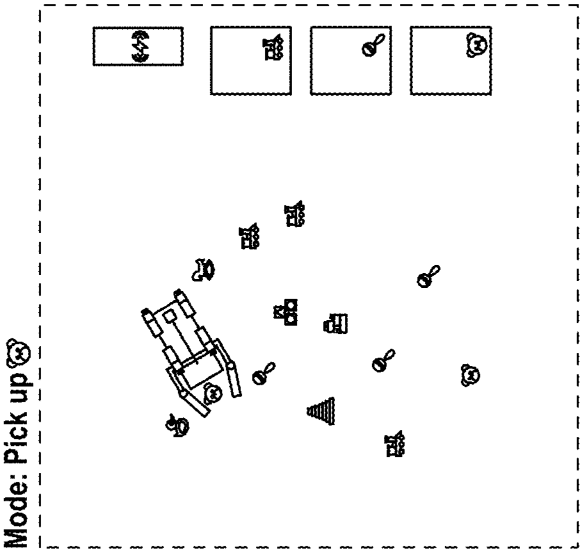
Figure 15C:
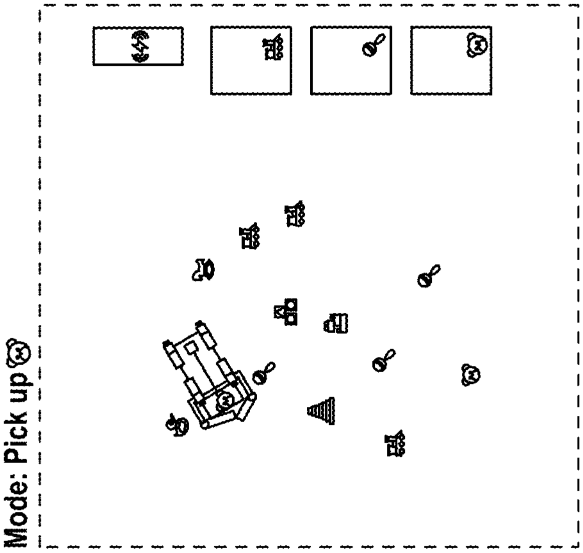

In the object pick-up state 1224, the robot selects a goal location that is adjacent to the target object(s) (block 1114). It uses a path planning algorithm to navigate itself to that new location while avoiding obstacles (FIG. 15A). The robot actuates left and right pusher arms to create an opening large enough that the target object can fit through, but not so large that other unwanted objects are collected when the robot drives forwards (block 1116). The robot drives forwards so that the target object is between the left and right pusher arms, and the left and right pusher arms work together to push the target object onto the collection bucket (FIG. 15B, FIG. 15C and block 1118).

Figure 15D:
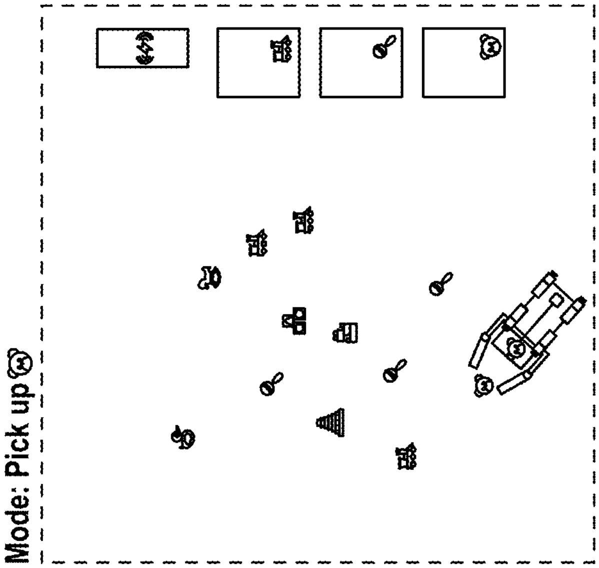
Figure 15E:
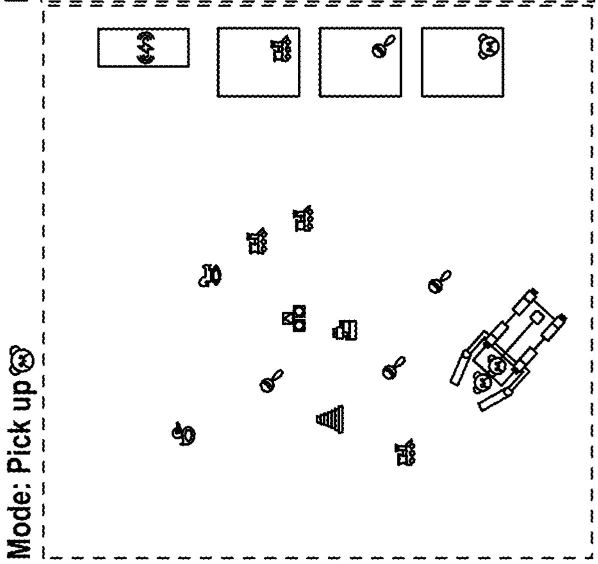
Figure 15F:
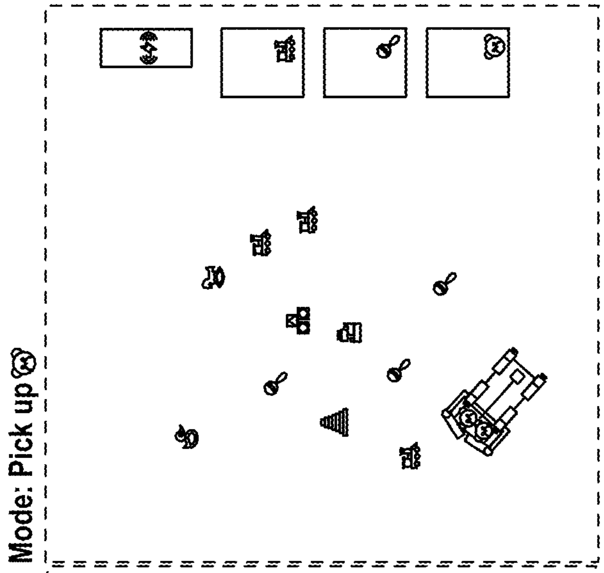

The robot may continue in the object pick-up state 1224 to identify other target objects of the selected type to pick up based on the map of environment. If other such objects are detected, the robot selects a new goal location that is adjacent to the target object. It uses a path planning algorithm to navigate itself to that new location while avoiding obstacles (FIG. 15D), while carrying the target object(s) that were previously collected. The robot actuates left and right pusher arms to create an opening large enough that the target object can fit through, but not so large that other unwanted objects are collected when the robot drives forwards. The robot drives forwards so that the next target object(s) are between the left and right pusher arms (FIG. 15E). Again, the left and right pusher arms work together to push the target object onto the collection bucket (FIG. 15F).

Figure 16B:
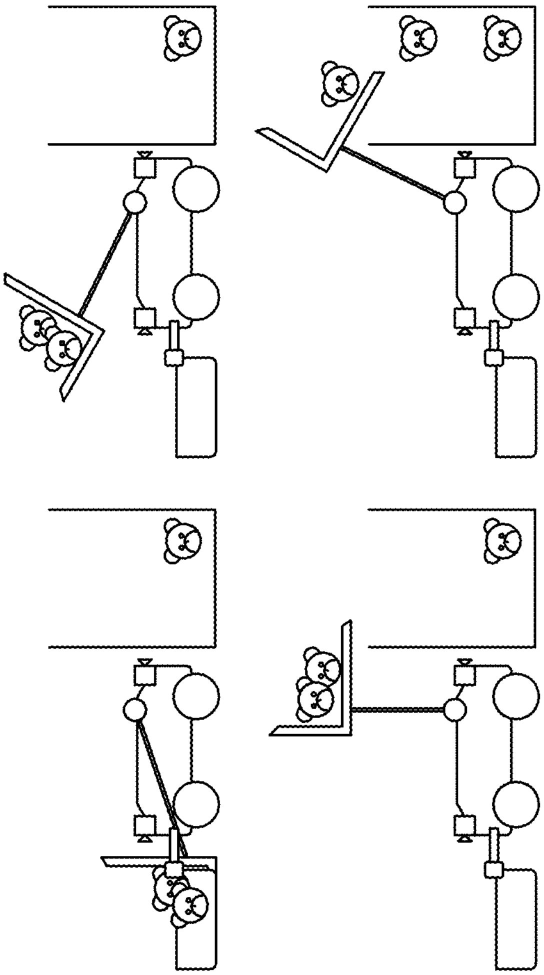
FIG. 16A-FIG. 16B depict an example of a robotic system in a drop off mode.
Figure 16A:
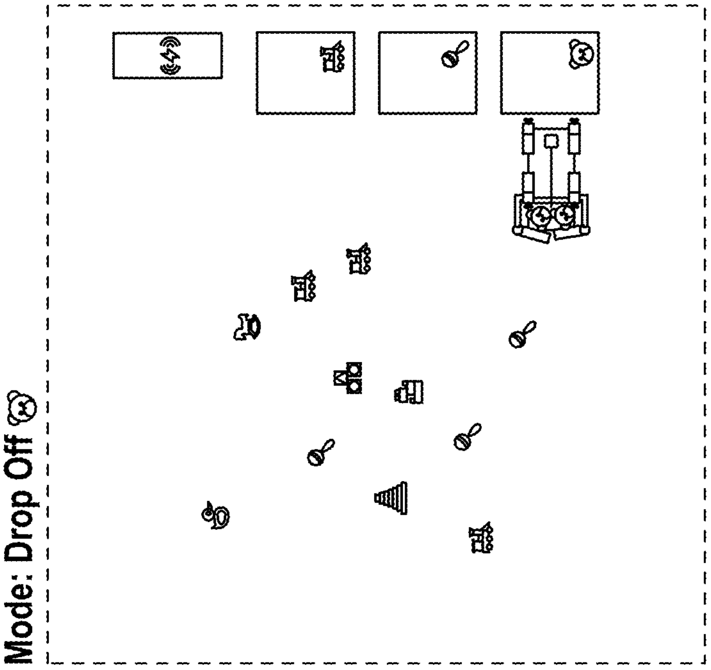

On condition that all identified objects in category are picked up 1232, or if the bucket is at capacity 1234, the robot transitions to the object drop-off state 1236 and uses the map of the environment to select goal location that is adjacent to bin for the type of objects collected and uses a path planning algorithm to navigate itself to that new location while avoiding obstacles (block 1120). The robot backs up towards the bin into a docking position where back of the robot is aligned with the back of the bin (FIG. 16A and block 1122). The robot lifts the bucket up and backwards rotating over a rigid arm at the back of the robot (block 1124). This lifts the target objects up above the top of the bin and dumps them into the bin (FIG. 16B).

From the object drop-off state 1236, the robot may transition back to the environment exploration state 1204 on condition that there are more items to pick up 1238, or it has an incomplete map of the environment 1240. the robot resumes exploring and the process may be repeated (block 1126) for each other type of object in the environment having an associated collection bin.

The robot may alternatively transition from the object drop-off state 1236 to the sleep state 1202 on condition that there are no more objects to pick up 1212 or the battery is low 1214. Once the battery recharges sufficiently, or at the next activation or scheduled pick-up interval, the robot resumes exploring and the process may be repeated (block 1126) for each other type of object in the environment having an associated collection bin.

Figure 17:
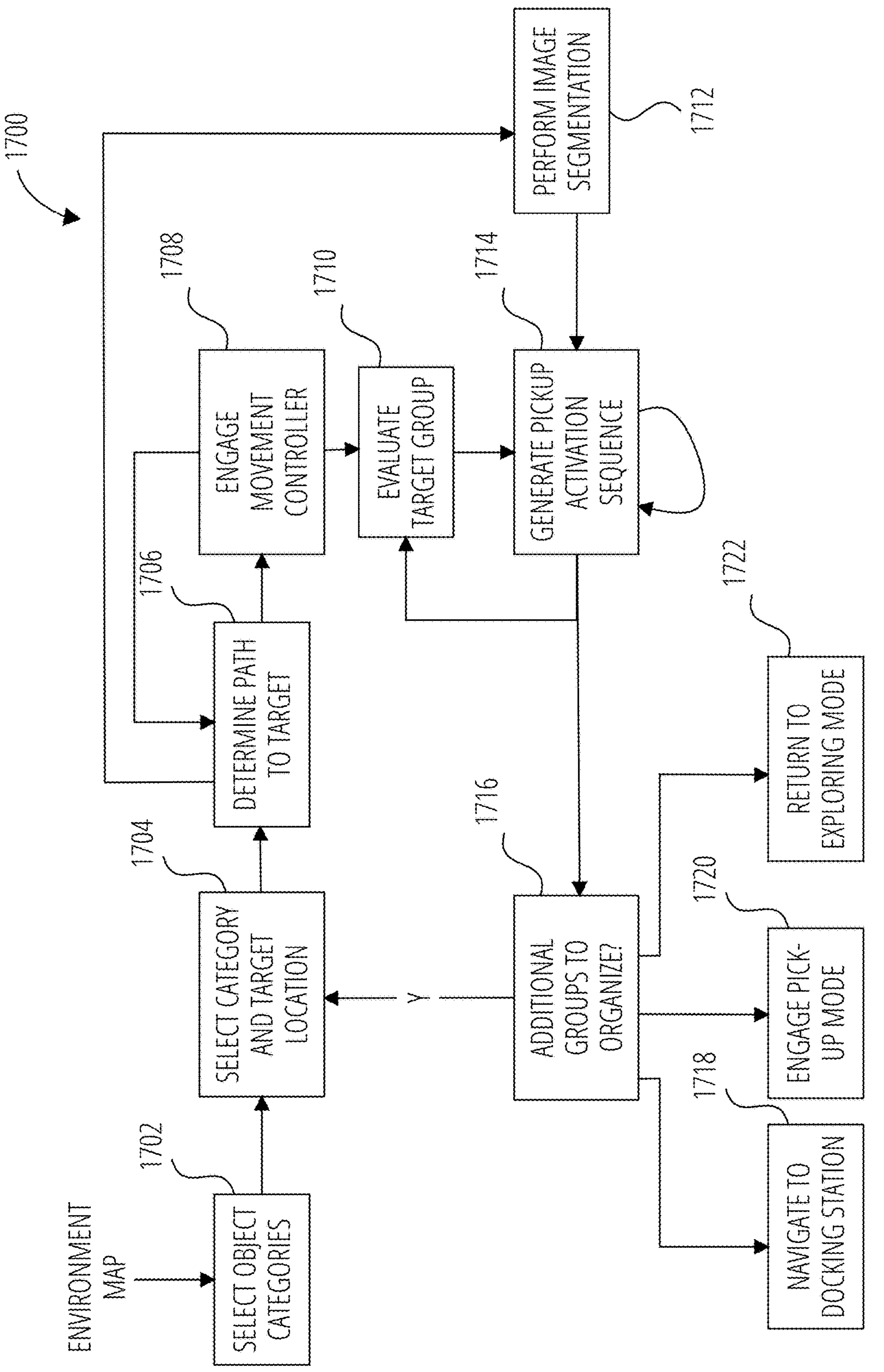
FIG. 17 depicts a robotic control algorithm 1700 for a robotic system in accordance with one embodiment.

FIG. 17 depicts a robotic control algorithm 1700 for a robotic system in one embodiment. The robotic control algorithm 1700 begins by selecting one or more category of objects to organize (block 1702). Within the selected category or categories, a grouping is identified that determines a target category and starting location for the path (block 1704). Any of a number of well-known clustering algorithms may be utilized to identify object groupings within the category or categories.

A path is formed to the starting goal location, the path comprising zero or more waypoints (block 1706). Movement feedback is provided back to the path planning algorithm. The waypoints may be selected to avoid static and/or dynamic (moving) obstacles (objects not in the target group and/or category). The robot's movement controller is engaged to follow the waypoints to the target group (block 1708). The target group is evaluated upon achieving the goal location, including additional qualifications to determine if it may be safely organized (block 1710).

The robot's perception system is engaged (block 1712) to provide image segmentation for determination of a sequence of activations generated for the robot's manipulators (e.g., arms) and positioning system (e.g., wheels) to organize the group (block 1714). The sequencing of activations is repeated until the target group is organized, or fails to organize (failure causing regression to block 1710). Engagement of the perception system may be triggered by proximity to the target group. Once the target group is organized, and on condition that there is sufficient battery life left for the robot and there are more groups in the category or categories to organize, these actions are repeated (block 1716).

In response to low battery life the robot navigates back to the docking station to charge (block 1718). However, if there is adequate battery life, and on condition that the category or categories are organized, the robot enters object pick-up mode (block 1720), and picks up one of the organized groups for return to the drop-off container. Entering pickup mode may also be conditioned on the environment map comprising at least one drop-off container for the target objects, and the existence of unobstructed objects in the target group for pick-up. On condition that no group of objects is ready for pick up, the robot continues to explore the environment (block 1722).

Figure 18:
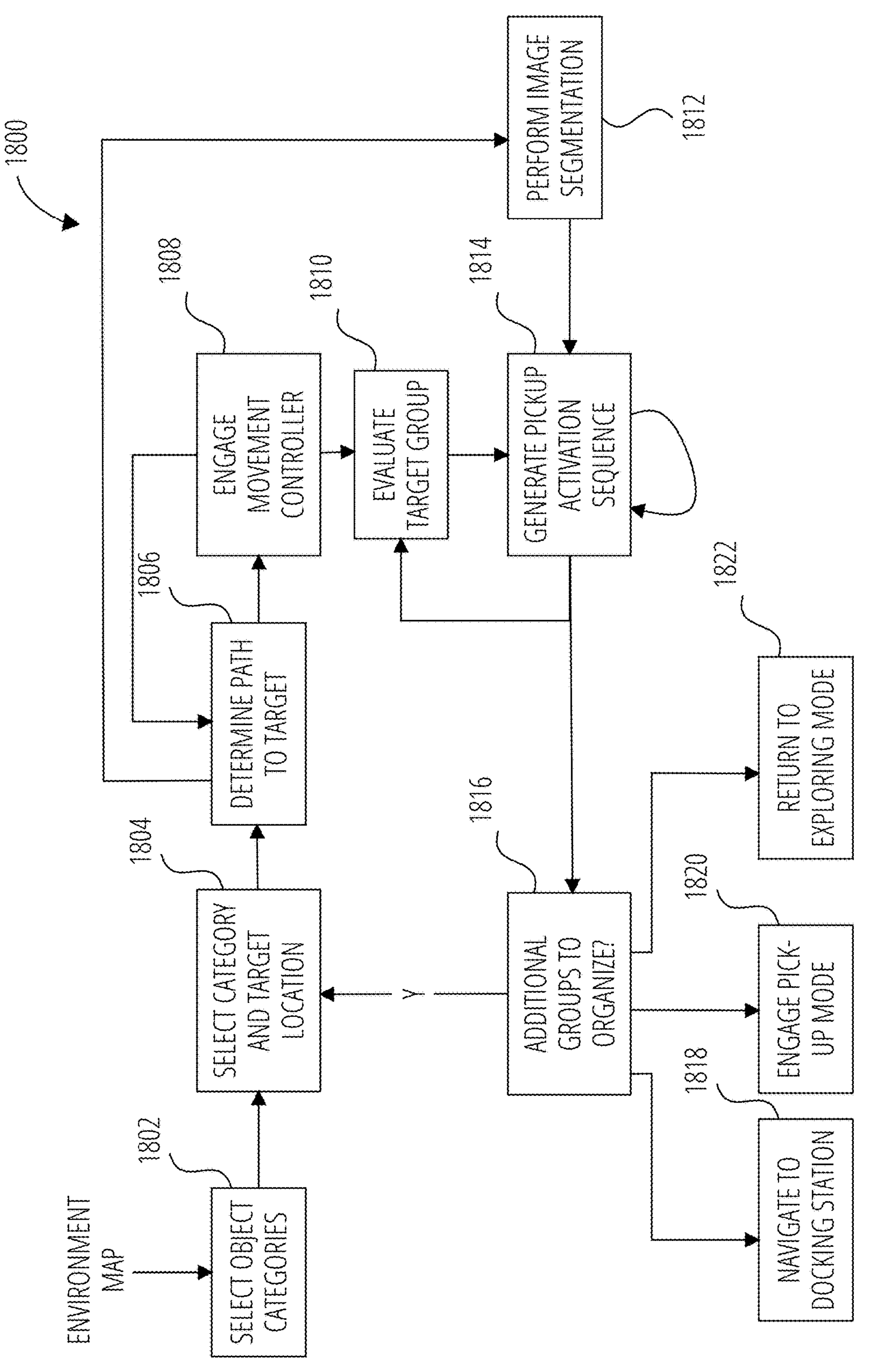
FIG. 18 depicts a robotic control algorithm 1800 for a robotic system in accordance with one embodiment.

FIG. 18 depicts a robotic control algorithm 1800 for a robotic system in one embodiment. The robotic control algorithm 1800 begins by selecting one or more category of objects to organize (block 1802). Within the selected category or categories, a grouping is identified that determines a target category and starting location for the path (block 1804). Any of a number of well-known clustering algorithms may be utilized to identify object groupings within the category or categories.

A path is formed to the starting goal location, the path comprising zero or more waypoints (block 1806). Movement feedback is provided back to the path planning algorithm. The waypoints may be selected to avoid static and/or dynamic (moving) obstacles (objects not in the target group and/or category). The robot's movement controller is engaged to follow the waypoints to the target group (block 1808). The target group is evaluated upon achieving the goal location, including additional qualifications to determine if it may be safely organized (block 1810).

The robot's perception system is engaged (block 1812) to provide image segmentation for determination of a sequence of activations generated for the robot's manipulators (e.g., arms) and positioning system (e.g., wheels) to organize the group (block 1814). The sequencing of activations is repeated until the target group is organized, or fails to organize (failure causing regression to block 1810). Engagement of the perception system may be triggered by proximity to the target group. Once the target group is organized, and on condition that there is sufficient battery life left for the robot and there are more groups in the category or categories to organize, these actions are repeated (block 1816).

In response to low battery life the robot navigates back to the docking station to charge (block 1818). However, if there is adequate battery life, and on condition that the category or categories are organized, the robot enters object pick-up mode (block 1820), and picks up one of the organized groups for return to the drop-off container. Entering pickup mode may also be conditioned on the environment map comprising at least one drop-off container for the target objects, and the existence of unobstructed objects in the target group for pick-up. On condition that no group of objects is ready for pick up, the robot continues to explore the environment (block 1822).

Figure 19:
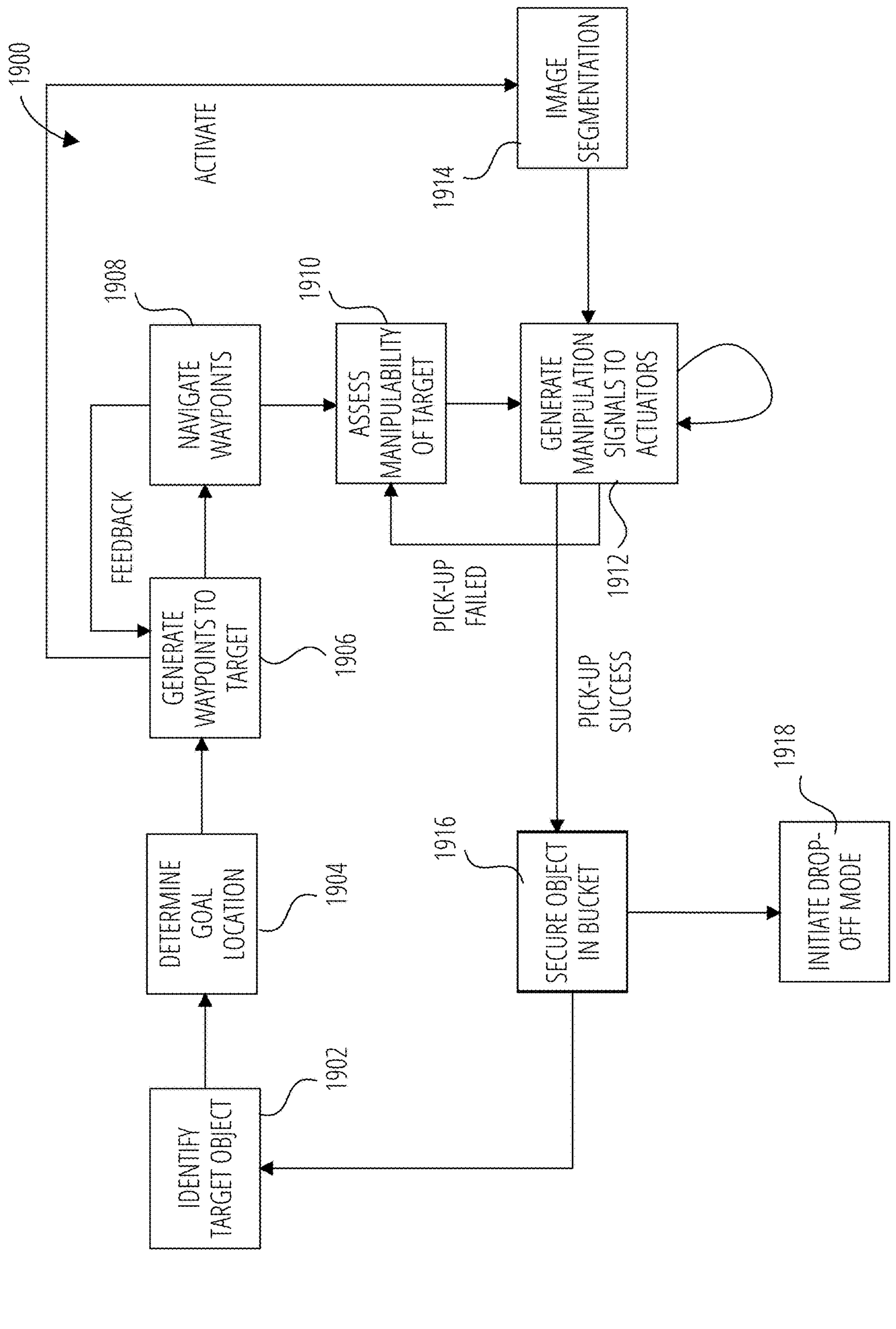
FIG. 19 depicts a robotic control algorithm 1900 for a robotic system in accordance with one embodiment.

FIG. 19 depicts a robotic control algorithm 1900 for a robotic system in one embodiment. A target object in the chosen object category is identified (item 1902) and a goal location for the robot is determined as an adjacent location of the target object (item 1904). A path to the target object is determined as a series of waypoints (item 1906) and the robot is navigated along the path while avoiding obstacles (item 1908).

Once the adjacent location is reached, as assessment of the target object is made to determine if can be safely manipulated (item 1910). On condition that the target object can be safely manipulated, the robot is operated to lift the object using the robot's manipulator arm, e.g., bucket (item 1912). The robot's perception module may by utilized at this time to analyze the target object and nearby objects to better control the manipulation (item 1914).

The target object, once on the bucket or other manipulator arm, is secured (item 1916). On condition that the robot does not have capacity for more objects, or it's the last object of the selected category(ies), object drop-off mode is initiated (item 1918). Otherwise the robot may begin the process again (1902).

Figure 20:
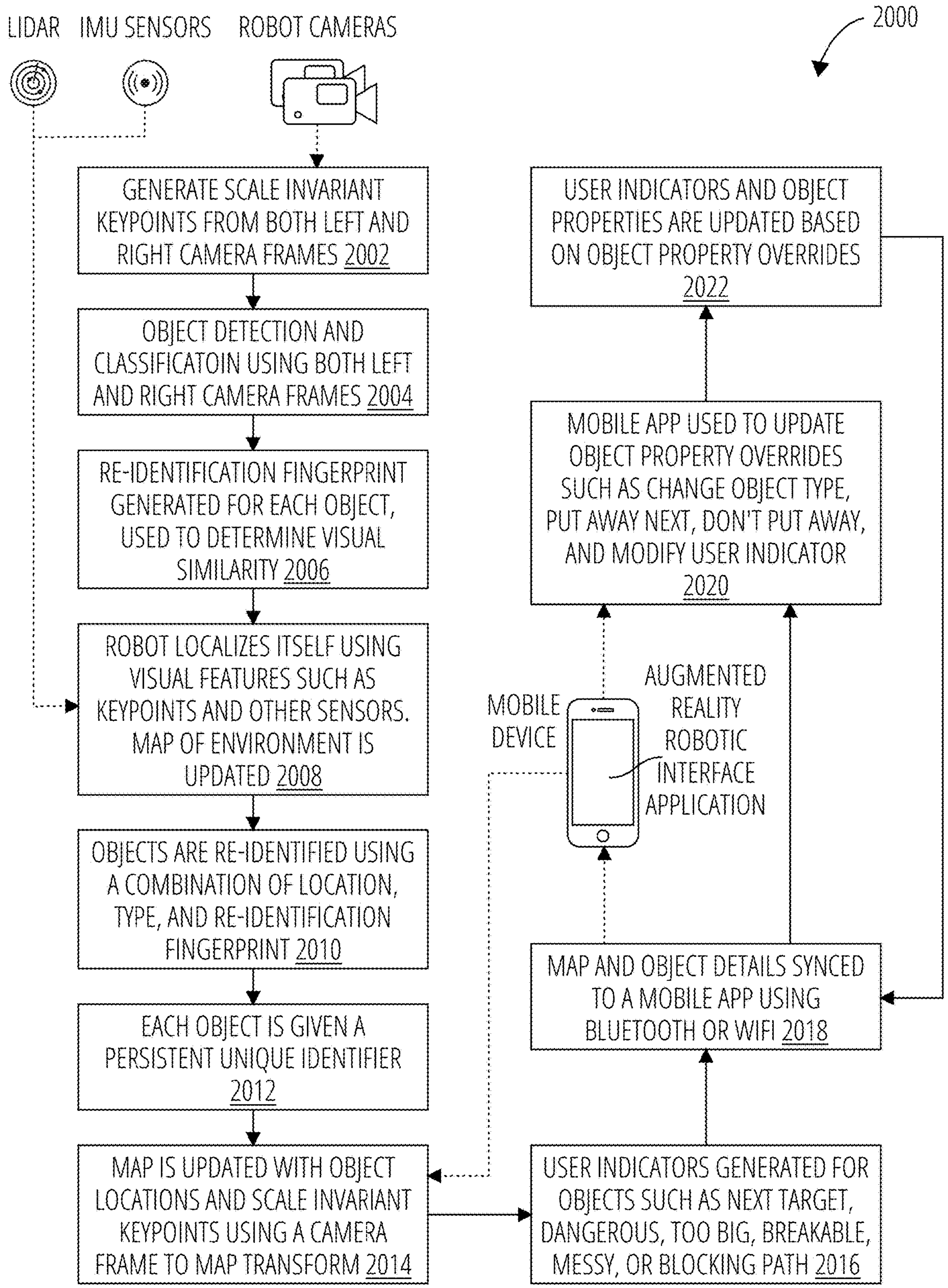
FIG. 20 depicts a robotic control algorithm 2000 in accordance with one embodiment.

FIG. 20 illustrates a robotic control algorithm 2000 in accordance with one embodiment. At block 2002, a left camera and a right camera, or some other configuration of robot cameras, of a decluttering robot such as that described with respect to FIG. 7A through FIG. 7D, may provide input that may be used to generate scale invariant keypoints within a decluttering area.

"Scale invariant keypoint" or "visual keypoint" in this disclosure refers to a distinctive visual feature that may be maintained across different perspectives, such as photos taken from different areas. This may be an aspect within an image captured of a decluttering area that may be used to identify a feature of the area or an object within the area when this feature or object is captured in other images taken from different angles, at different scales, or using different resolutions from the original capture.

Scale invariant keypoints may be detected by a decluttering robot or an augmented reality robotic interface installed on a mobile device based on images taken by the robot's cameras or the mobile device's cameras. Scale invariant keypoints may help a decluttering robot or an augmented reality robotic interface on a mobile device to determine a geometric transform between camera frames displaying matching content. This may aid in confirming or fine-tuning an estimate of the robot's or mobile device's location within the decluttering area.

Scale invariant keypoints may be detected, transformed, and matched for use through algorithms well understood in the art, such as (but not limited to) Scale-Invariant Feature Transform (SIFT), Speeded-Up Robust Features (SURF), Oriented Robust Binary features (ORB), and SuperPoint.

Objects located in the decluttering area may be detected at block 2004 based on the input from the left camera and the right camera, thereby defining starting locations for the objects and classifying the objects into categories. At block 2006, re-identification fingerprints may be generated for the objects, wherein the re-identification fingerprints are used to determine visual similarity of objects detected in the future with the objects. The objects detected in the future may be the same objects, redetected as part of an update or transformation of the global area map, or may be similar objects located similarly at a future time, wherein the re-identification fingerprints may be used to assist in more rapidly classifying the objects.

At block 2008, the decluttering robot may be localized within the decluttering area. Input from at least one of the left camera, the right camera, light detecting and ranging (LIDAR) sensors, and inertial measurement unit (IMU) sensors may be used to determine a decluttering robot location. The decluttering area may be mapped to create a global area map that includes the scale invariant keypoints, the objects, and the starting locations of the objects. The objects within the decluttering area may be re-identified at block 2010 based on at least one of the starting locations, the categories, and the re-identification fingerprints. Each object may be assigned a persistent unique identifier at block 2012.

At block 2014, the decluttering robots may receive a camera frame from an augmented reality robotic interface installed as an application on a mobile device operated by a user, and may update the global area map with the starting locations and scale invariant keypoints using a camera frame to global area map transform based on the camera frame. In the camera frame to global area map transform, the global area map may be searched to find a set of scale invariant keypoints that match the those detected in the mobile camera frame by using a specific geometric transform. This transform may maximize the number of matching keypoints and minimize the number of non-matching keypoints while maintaining geometric consistency.

At block 2016, user indicators may be generated for objects, wherein user indicators may include next target, target order, dangerous, too big, breakable, messy, and blocking travel path. The global area map and object details may be transmitted to the mobile device at block 2018, wherein object details may include at least one of visual snapshots, the categories, the starting locations, the persistent unique identifiers, and the user indicators of the objects. This information may be transmitted using wireless signaling such as BlueTooth or Wifi, as supported by the communications 724 module introduced in FIG. 7C and the network interface 2402 introduced in FIG. 24.

The updated global area map, the objects, the starting locations, the scale invariant keypoints, and the object details, may be displayed on the mobile device using the augmented reality robotic interface. The augmented reality robotic interface may accept user inputs to the augmented reality robotic interface, wherein the user inputs indicate object property overrides including change object type, put away next, don't put away, and modify user indicator, at block 2020. The object property overrides may be transmitted from the mobile device to the decluttering robot, and may be used at block 2022 to update the global area map, the user indicators, and the object details. Returning to block 2018, the decluttering robot may re-transmit its updated global area map to the mobile device to resynchronize this information.

Figure 21:
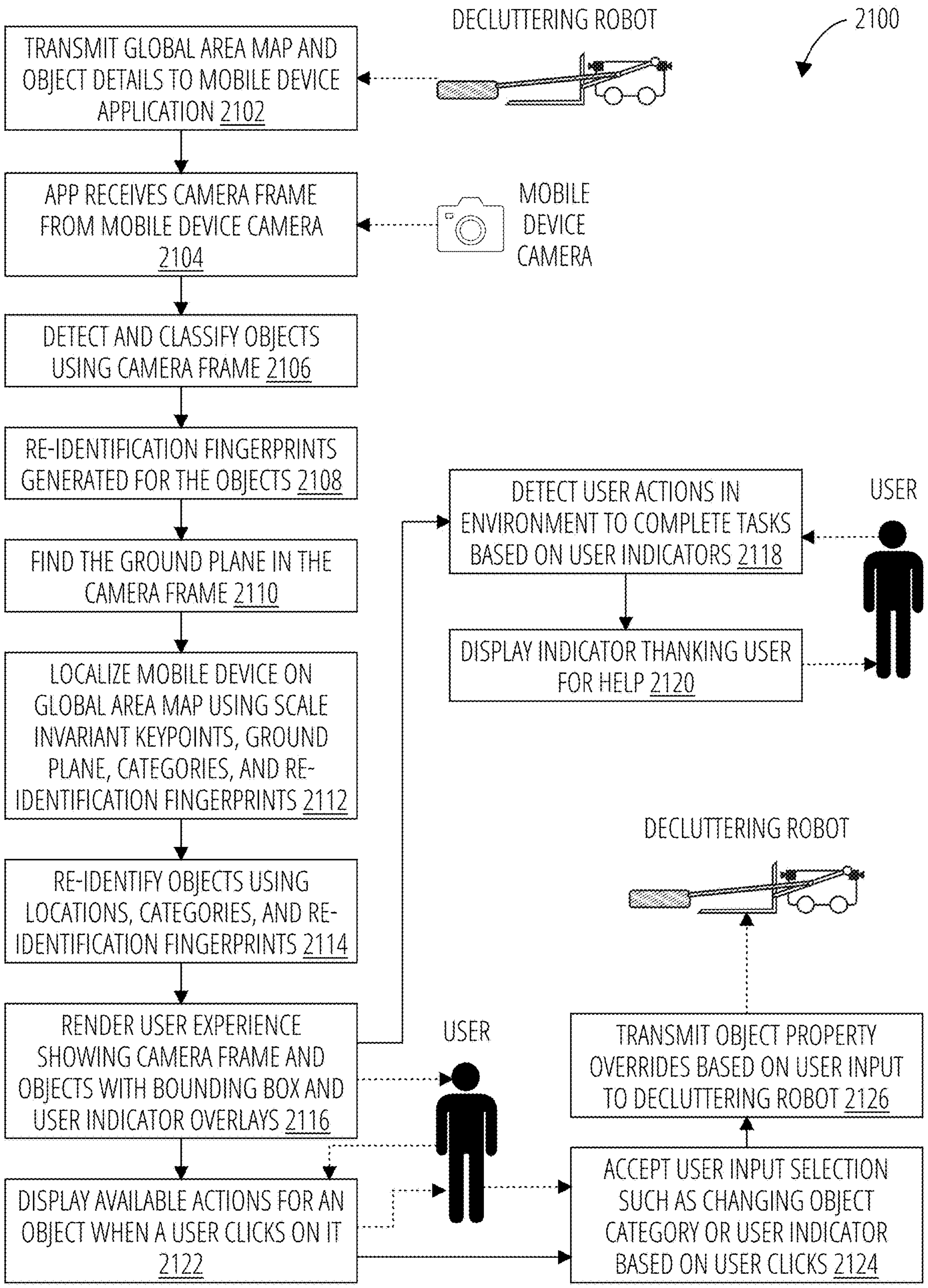
FIG. 21 depicts a robotic control algorithm 2100 in accordance with one embodiment.

FIG. 21 illustrates a robotic control algorithm 2100 in accordance with one embodiment. At block 2102, a decluttering robot may transmit a global area map representing a decluttering area to an augmented reality robotic interface installed as an application on a mobile device. The global area map may include object details pertaining to objects cluttering the decluttering area. The mobile device may include a camera. At block 2104, the augmented reality robotic interface application may receive a camera frame from the mobile device camera. The camera frame may be used to detect the objects in the decluttering area and to classify them into categories at block 2106.

At block 2108, re-identification fingerprints may be generated for the objects. The re-identification fingerprints may be used to determine visual similarity of objects detected in the future with the objects. The objects detected in the future may be the same objects, redetected as part of an update or transformation of the global area map, or may be similar objects located similarly at a future time, wherein the re-identification fingerprints may be used to assist in more rapidly classifying the objects.

At block 2110, a ground plane may be detected in the camera frame. The mobile device may be localized on the global area map at block 2112 using at least one of the ground plane, the objects, the object categories, and the re-identification fingerprints. At block 2114, the objects may be re-identified based on at least one of the starting locations, the categories, and the re-identification fingerprints.

At block 2116, a user experience may be rendered in the augmented reality robotic interface showing the camera frame, the objects, and bounding boxes and user indicators overlayed on the objects. The augmented reality robotic interface may accept user input based on a user's interaction with the user indicators. This user interaction may include clicking or tapping on the user indicator. In one embodiment, user indicators may include actions to be taken by the user, and at block 2118 the augmented reality robotic interface may detect a user's actions taken in the decluttering area to complete those indicated tasks. In one embodiment, the user actions may be detected through user confirmation through the augmented reality robotic interface, changes noted between the previous camera frame and an updated camera frame or based on information from cameras and sensors of a decluttering robot. A display indicator may thank the user for their help at block 2120.

At block 2122, the augmented reality robotic interface may display available actions for objects based on the user input (e.g., a user's click or tap on a user indicator). The augmented reality robotic interface may then accept additional user input selecting at least one of the available actions presented in block 2124. The augmented reality robotic interface may at 2126 transmit object property overrides to the decluttering robot based on the additional user input.

Figure 22:
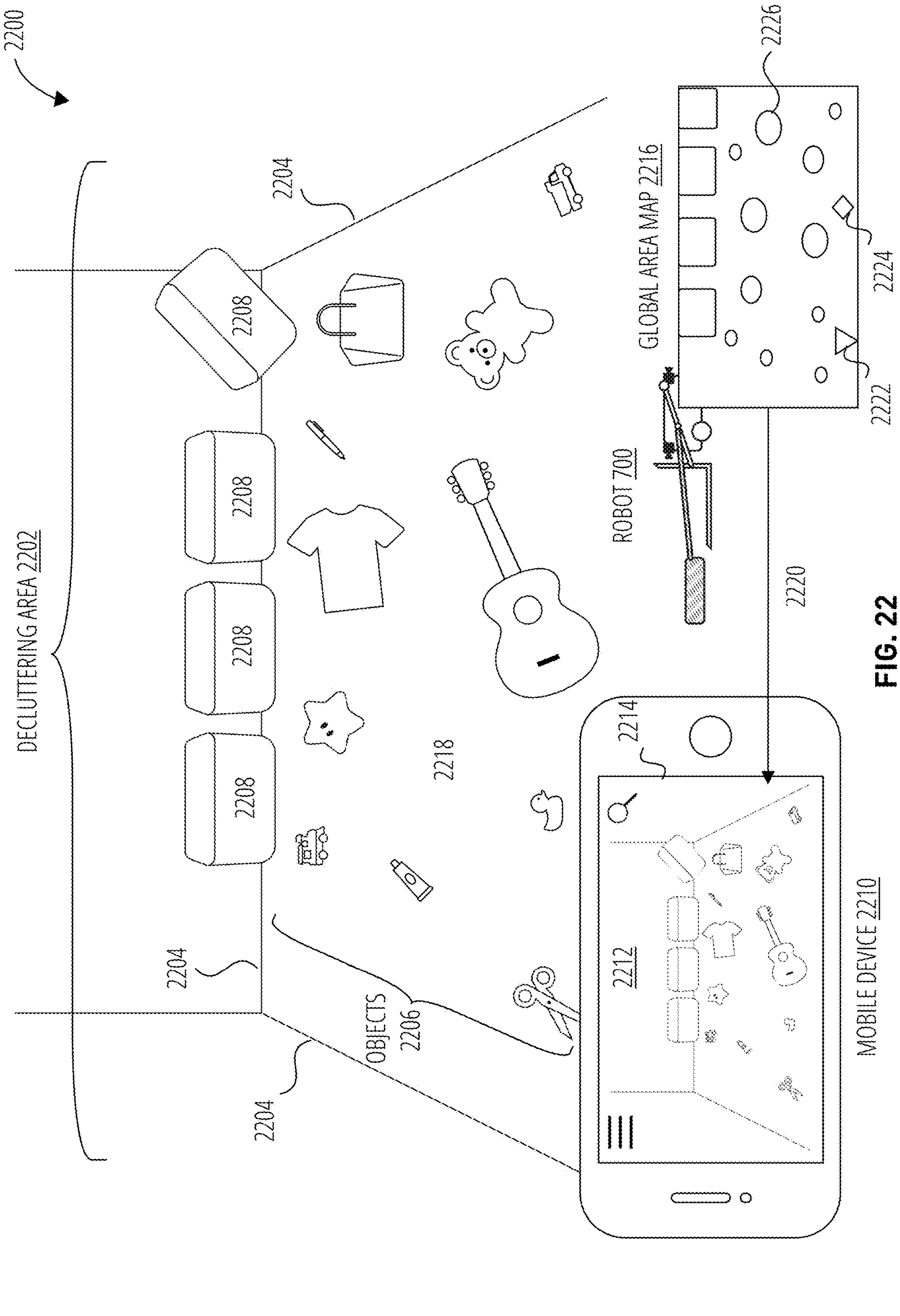
FIG. 22 depicts a decluttering robot environment 2200 in accordance with one embodiment.

FIG. 22 illustrates a decluttering robot environment 2200 in accordance with one embodiment. The decluttering robot environment 2200 may include a decluttering area 2202, scale invariant keypoints 2204, objects 2206 cluttering the area, destination bins 2208 where the objects 2206 may be placed, a mobile device 2210 with an augmented reality robotic interface application 2212 installed and the ability to provide a camera frame 2214, and a robot 700.

The robot 700 may use its sensors and cameras illustrated in FIG. 7C and FIG. 7D to detect the features of a decluttering area 2202. These features may include scale invariant keypoints 2204, such as walls, corners, furniture, etc. The robot 700 may also detect objects 2206 on the floor of the decluttering area 2202 and destination bins 2208 where those objects 2206 may be placed based on categories the robot 700 may determine based on user input, recognition of similarity to objects handled in the past, machine learning, or some combination of these. The robot 700 may use its sensors and cameras to localize itself within the 2202 as well. The robot 700 may synthesize all of this data into a global area map 2216 as described with regard to FIG. 20.

The decluttering robot environment 2200 may include a user in possession of a mobile device 2210 such as a tablet or a smart phone. The mobile device 2210 may have an augmented reality robotic interface application 2212 installed that functions in accordance with the present disclosure. The augmented reality robotic interface application 2212 may provide a camera frame 2214 using a camera configured as part of the mobile device 2210. The camera frame 2214 may include a ground plane 2218 that may be identified and used to localize the mobile device 2210 within the decluttering robot environment 2200 such that information regarding the decluttering area 2202 detected by the robot 700 may be transformed according camera frame to global area map transform 2220 to allow the robot 700 and the mobile device 2210 to stay synchronized with regard to the objects 2206 in the decluttering area 2202 and the user indicators and object property overrides attached to those objects 2206 as described with respect to FIG. 20 and FIG. 21, and described in further detail with respect to FIG. 23A.

The global area map 2216 may be a top-down two-dimensional representation of the decluttering area 2202 in one embodiment. The global area map 2216 may undergo a camera frame to global area map transform 2220 such that the information detected by the robot 700 may be represented in the augmented reality robotic interface application 2212 from a user's point of view. The global area map 2216 may be updated to include the mobile device location 2222, the decluttering robot location 2224, and object starting locations 2226. In one embodiment, the augmented reality robotic interface application 2212 may also show the mobile device location 2222 and decluttering robot location 2224, those these are not indicated in the present illustration.

Figure 23A:
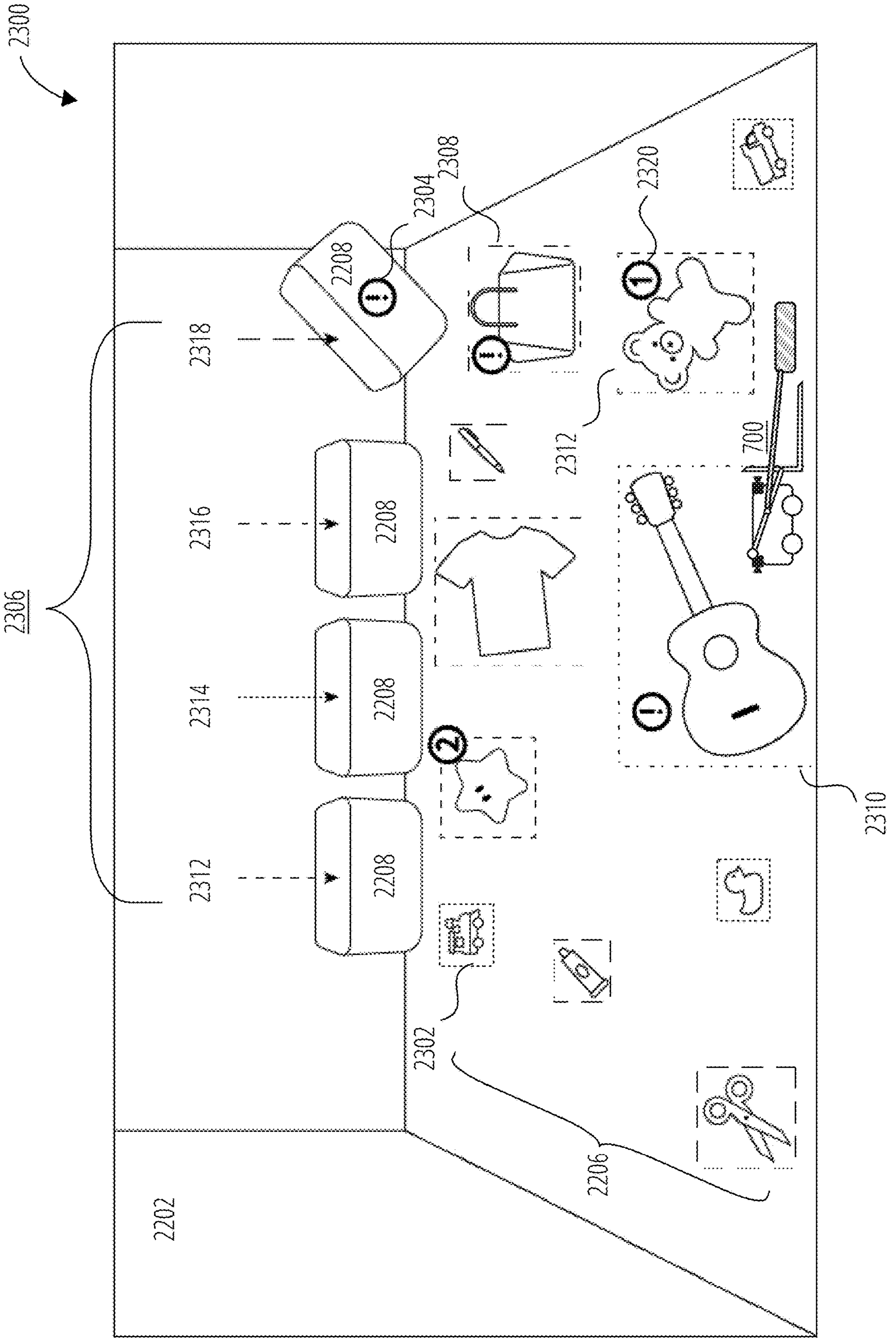
FIG. 23A through FIG. 23E depict an augmented reality robotic interface 2300 in accordance with one embodiment.

FIG. 23A illustrates an augmented reality robotic interface 2300 in accordance with one embodiment, at the beginning of a decluttering session. The augmented reality robotic interface 2300 may show the decluttering area 2202, including objects 2206 to be picked up and destination bins 2208, as introduced in the decluttering robot environment 2200 of FIG. 22. Bounding boxes 2302 and user indicators 2304 may be overlayed over the objects 2206 as shown. These may indicate categories 2306 for the objects 2206, as well as actions that need to be taken by the user with respect to items in the decluttering area 2202. In one embodiment, indicators may be provided for the destination bins 2208 to show what categories 2306 of objects 2206 are intended to be deposited in each. The robot may make this determination dynamically or may be trained or instructed by the user on bins to use consistently.

In the decluttering area 2202 illustrated, objects 2206 and destination bins 2208 may be categorized as pertaining to a general uncategorized 2308 type, a musical instrument 2310 type, stuffed animals 2312, plastic toys 2314, clothing 2316, and craft supplies 2318. Bounding boxes 2302 and other indicators associated with categories 2306 may differ in color, line weight and style, or other visual characteristics that may be easily differentiated visually.

User indicators 2304 may identify actions that are needed before decluttering may begin, shown as exclamation points. For example, a user may need to put a destination bin back into order if it is tipped over, missing, out of alignment, etc. Uncategorized objects such as a duffle bag and delicate and large objects such as a guitar may need to be picked up by the user instead of the robot. Other user indicators 2320 may use numerals to indicate the order in which the robot 700 will begin picking up objects 2206 once the user has completed the preliminary actions needed. For example, the user indicators 2320 shown may indicate that after user actions are completed, the robot 700 intends to begin decluttering by picking up the stuffed animals 2312. The user may clear the user indicators 2304 for the preliminary actions by clicking them after they have completed the task. The user may be able to click bounding boxes 2302 or user indicators 2304 associated with tidying order to adjust the order in which the robot 700 will pick up the objects 2206.

Figure 23B:
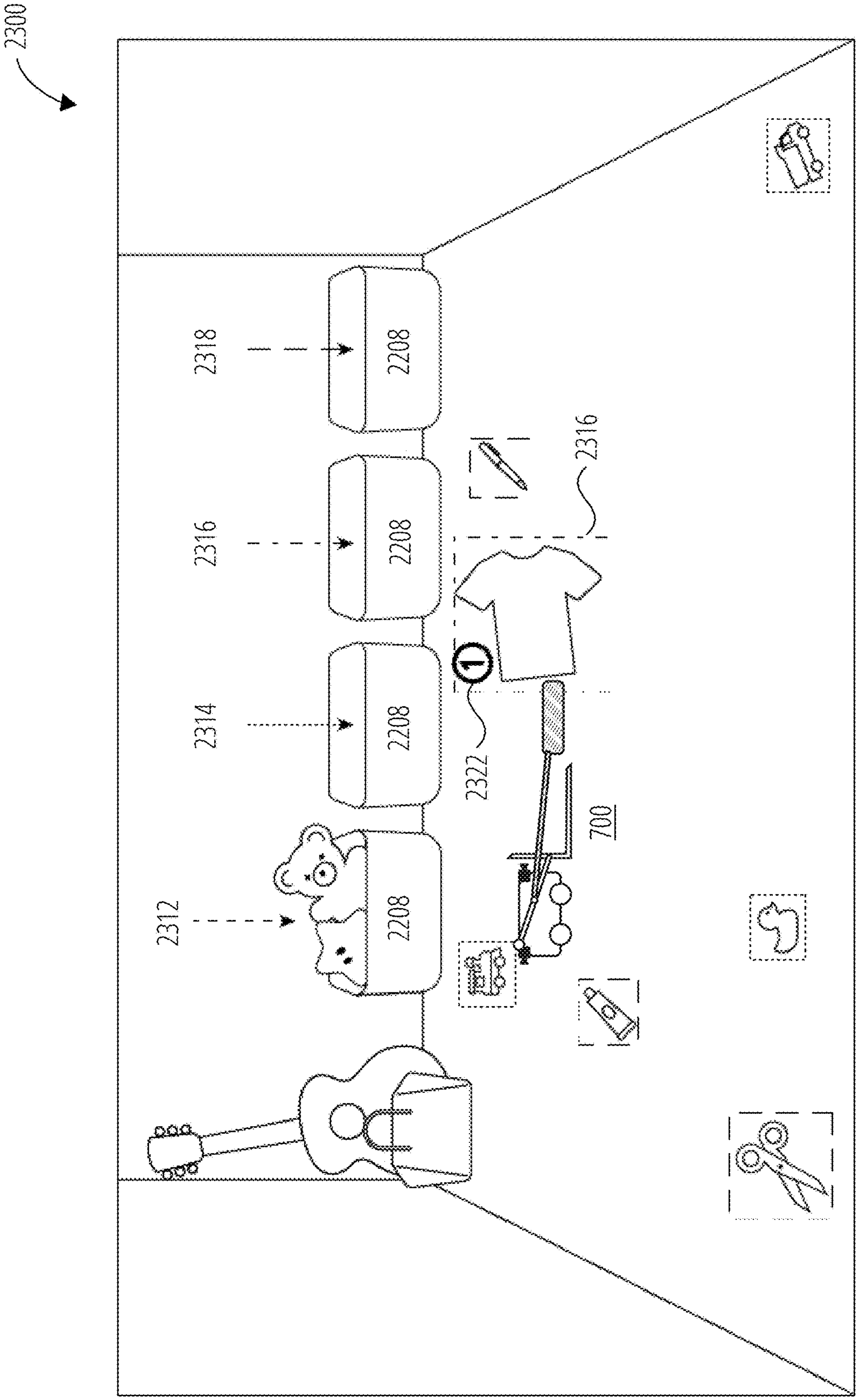

FIG. 23B illustrates the augmented reality robotic interface 2300 introduced in FIG. 23A, once the user indicators 2304 and 2320 have been cleared. The initial help actions requested by the robot have been completed. The bin has been placed correctly and the duffle bag (uncategorized 2308) and guitar (musical instrument 2310) have been cleared from the decluttering area 2202. The stuffed animals 2312 have been picked up by the robot 700 and deposited in the destination bin designated for them. A new user indicator 2322 indicates that the shirt (clothing 2316) is the next object intended to be picked up and placed in the designated bin.

These user indicators 2304 and 2320 may in one embodiment be cleared by the user as they complete their tasks and observe the robot, cleared by the augmented reality robotic interface 2300 as the objects 2206 are detected as displaced in the camera frame 2214 to acceptable destination locations, by the robot 700 as it no longer detects objects the user has moved in its path and as it picks up and deposits objects it intends to tidy, or some combination thereof.

Figure 23C:
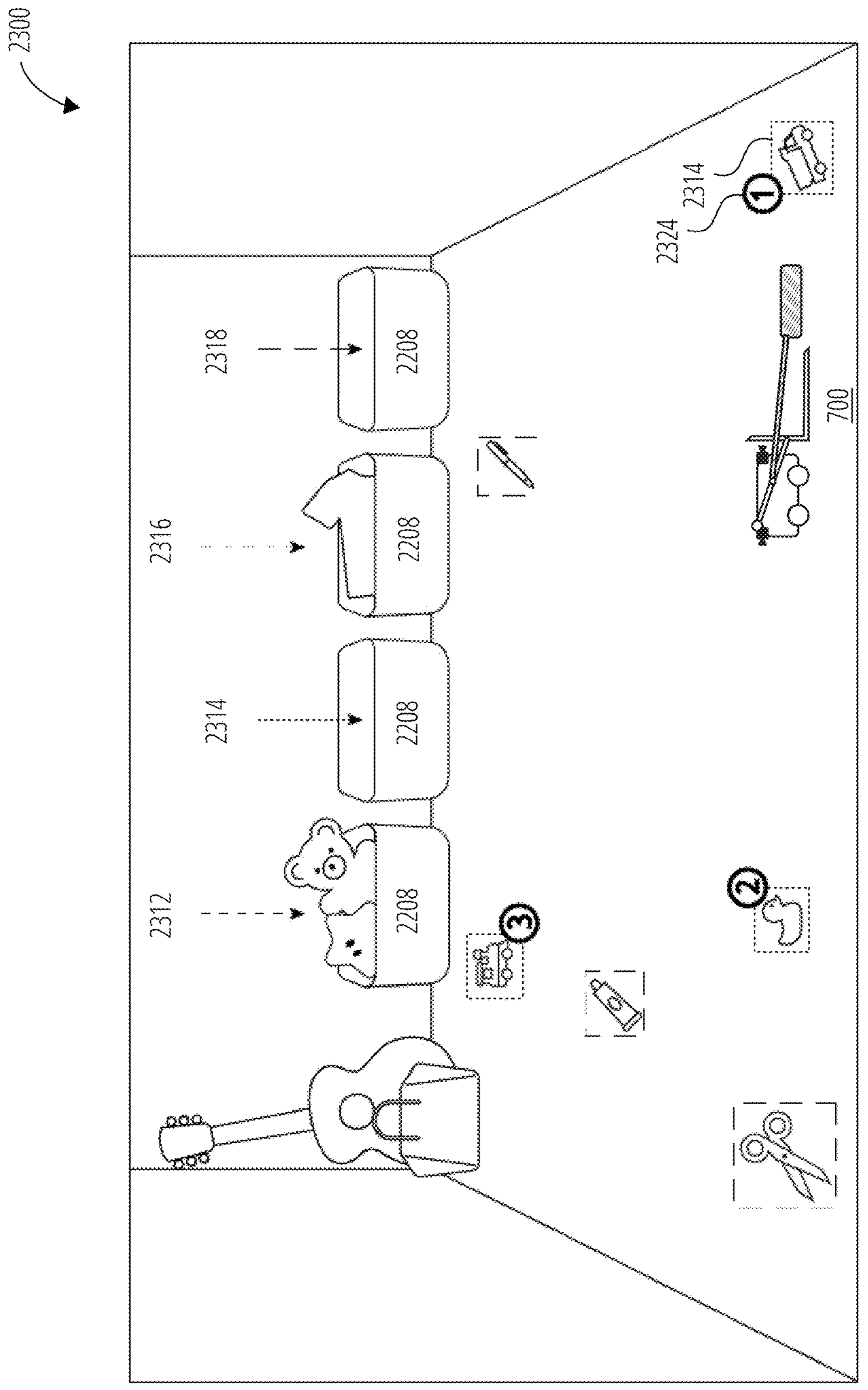

FIG. 23C illustrates the augmented reality robotic interface 2300 after the user indicator 2322 for the item of clothing 2316 has been cleared and the clothing 2316 placed in its designated bin. The next user indicators 2324 indicate the order in which the plastic toys 2314 are to be picked up and placed in their designated bin.

Figure 23D:
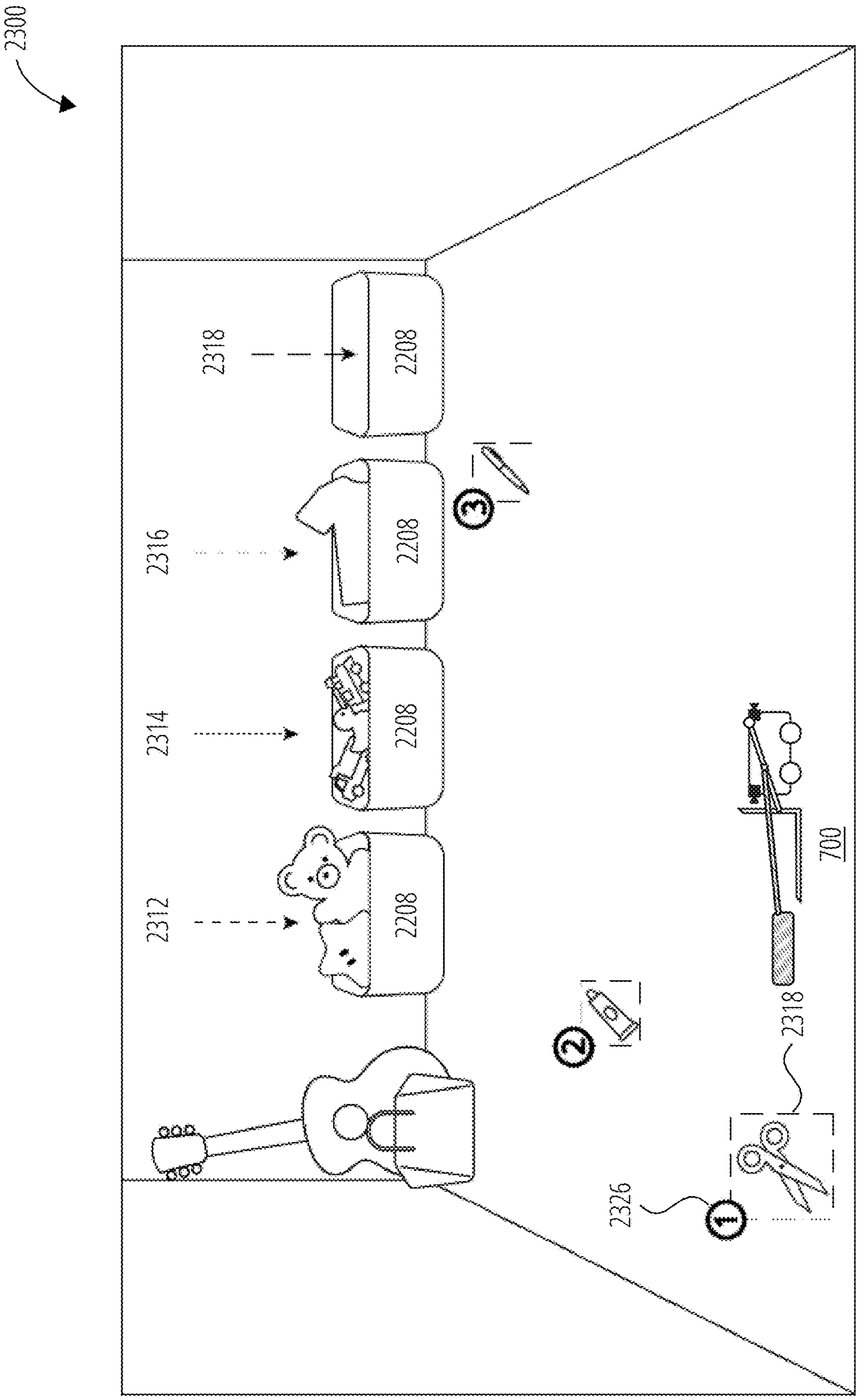

FIG. 23D illustrates the augmented reality robotic interface 2300 after the user indicators 2324 for the plastic toys 2314 have been cleared and those items placed in their designated bin. The user indicators 2326 now indicate the order in which the robot 700 intends to pick up the craft supplies 2318 for deposition in their designated bin.

Figure 23E:
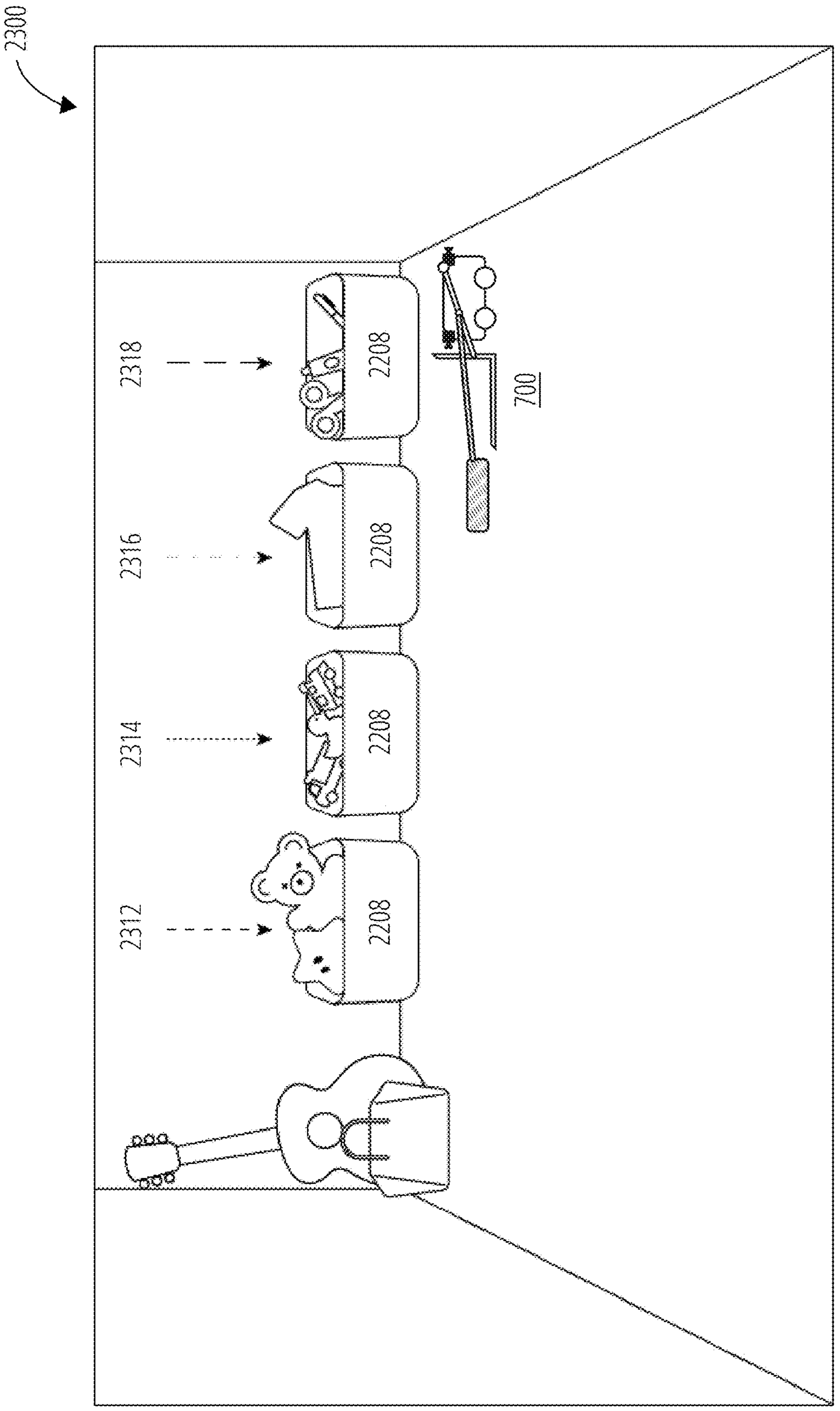

FIG. 23E illustrates the augmented reality robotic interface 2300 in accordance with one embodiment, after all items have been picked up and placed in their bins.

Figure 24:
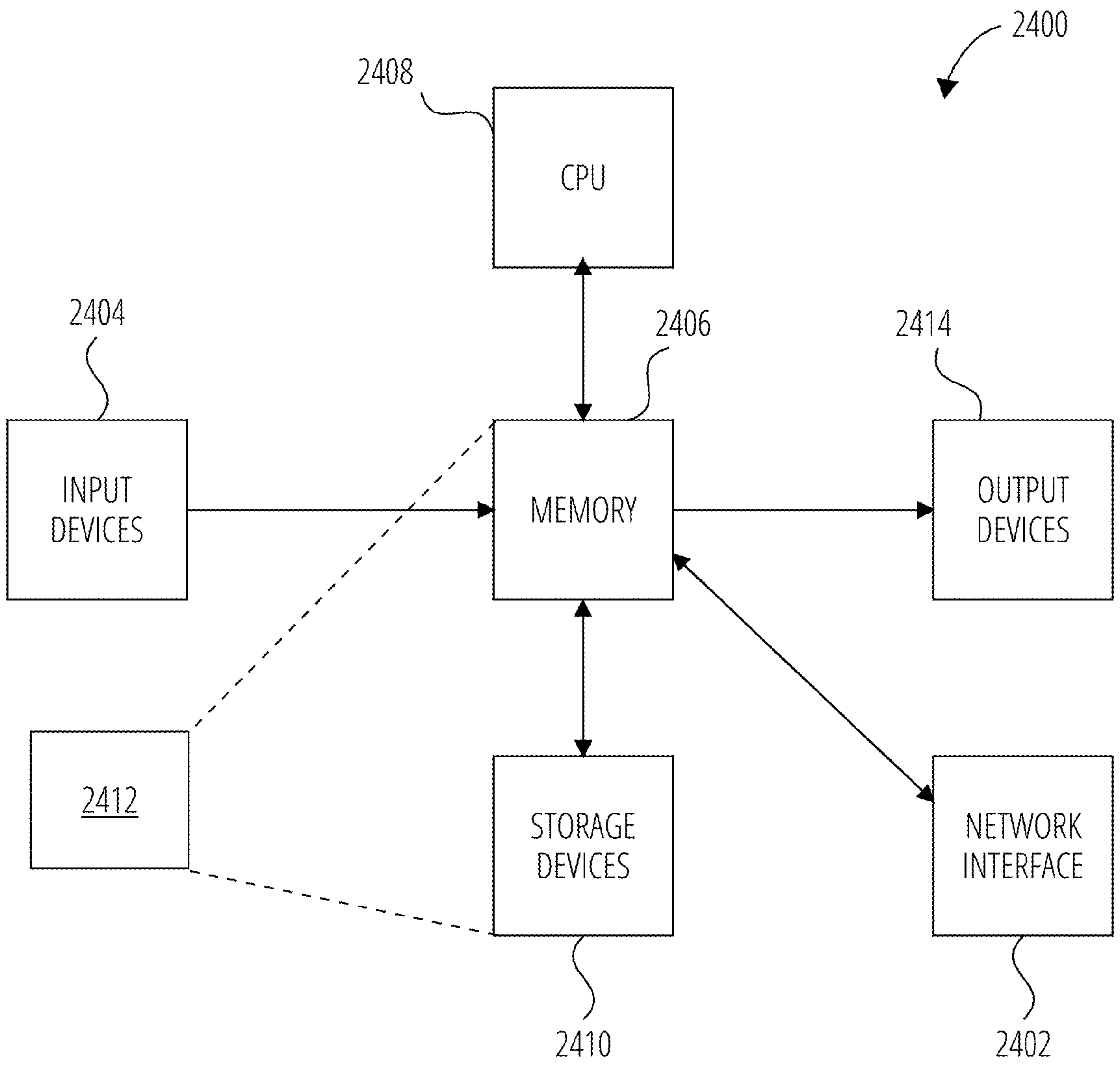
FIG. 24 depicts an embodiment of a robotic control system 2400 to implement components and process steps of the system described herein.

FIG. 24 depicts an embodiment of a robotic control system 2400 to implement components and process steps of the systems described herein.

Input devices 2404 (e.g., of a robot or companion device such as a mobile phone or personal computer) comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 2404 are contact sensors which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 2404 are provided via various machine signal conductors (e.g., busses or network interfaces) and circuits to memory 2406.

The memory 2406 is typically what is known as a first or second level memory device, providing for storage (via configuration of matter or states of matter) of signals received from the input devices 2404, instructions and information for controlling operation of the CPU 2408, and signals from storage devices 2410. The memory 2406 and/or the storage devices 2410 may store computer-executable instructions and thus forming logic 2412 that when applied to and executed by the CPU 2408 implement embodiments of the processes disclosed herein.

Information stored in the memory 2406 is typically directly accessible to the CPU 2408 of the device. Signals input to the device cause the reconfiguration of the internal material/energy state of the memory 2406, creating in essence a new machine configuration, influencing the behavior of the robotic control system 2400 by configuring the CPU 2408 with control signals (instructions) and data provided in conjunction with the control signals.

Second or third level storage devices 2410 may provide a slower but higher capacity machine memory capability. Examples of storage devices 2410 are hard disks, optical disks, large capacity flash memories or other non-volatile memory technologies, and magnetic memories.

The CPU 2408 may cause the configuration of the memory 2406 to be altered by signals in storage devices 2410. In other words, the CPU 2408 may cause data and instructions to be read from storage devices 2410 in the memory 2406 from which may then influence the operations of CPU 2408 as instructions and data signals, and from which it may also be provided to the output devices 2414. The CPU 2408 may alter the content of the memory 2406 by signaling to a machine interface of memory 2406 to alter the internal configuration, and then converted signals to the storage devices 2410 to alter its material internal configuration. In other words, data and instructions may be backed up from memory 2406, which is often volatile, to storage devices 2410, which are often non-volatile.

Output devices 2414 are transducers which convert signals received from the memory 2406 into physical phenomenon such as vibrations in the air, or patterns of light on a machine display, or vibrations (i.e., haptic devices) or patterns of ink or other materials (i.e., printers and 3-D printers).

The network interface 2402 receives signals from the memory 2406 and converts them into electrical, optical, or wireless signals to other machines, typically via a machine network. The network interface 2402 also receives signals from the machine network and converts them into electrical, optical, or wireless signals to the memory 2406.

LISTING OF DRAWING ELEMENTS

100 robotics system
102 sensors
104 camera
106 localization logic
108 mapping logic
110 perception logic
112 path planner
114 pick-up planner
116 motion controller
118 motor and servo controller
120 calibration and objects
122 local to global transform
124 environment map
126 object tracking
128 current state
130 system state settings
132 synchronization signals
134 movement feedback
136 navigation waypoints
138 local perception with image segmentation
140 manipulation actions
142 target movement
144 image segmentation activation
200 robot
202 bucket
204 manipulator actuator arm
206 camera
208 bucket actuator arm
210 manipulator brush
302 seal
304 convexity
306 concavity
308 extended back surface
400 robot
402 camera
404 lift actuator arm
406 collection member
408 bucket
410 linear actuator
500 robot
502 bucket
504 camera
506 manipulator actuator arm
508 collection member
510 bucket actuator arm
600 robot
602 bucket
604 camera
606 manipulator actuator arm
608 collection member
610 bucket actuator arm
612 manipulator lift arm
700 robot
702 chassis
704 mobility system
706 sensing system
708 control system
710 capture and containment system
712 bucket
714 bucket lift arm
716 bucket lift arm pivot point
718 manipulator member
720 manipulator arm
722 arm pivot point
724 communications
726 front cameras
728 rear cameras
730 front lidar sensors
732 rear lidar sensors
734 IMU sensors
736 front right camera
738 front left camera
740 rear left camera
742 rear right camera
744 manipulator pivot point
800*a* lowered bucket position and lowered grabber position
800*b* lowered bucket position and raised grabber position
800*c* raised bucket position and raised grabber position
900 robot
902 bucket
904 camera
906 manipulator actuator arm
908 collection member
910 bucket actuator arm
1000 robotic process
1002 block
1004 block
1006 block
1008 opening loop block
1010 block
1012 block
1014 block
1016 block
1018 block
1020 block
1022 block
1024 block
1026 block
1028 block
1100 robotic process
1102 block
1104 block
1106 block
1108 block
1110 block
1112 block
1114 block
1116 block
1118 block
1120 block

1122 block
1124 block
1126 block
1200 state space map
1202 sleep state
1204 environment exploration state
1206 activation action
1208 schedule start time
1210 explore for configured interval
1212 no more objects to pick up
1214 battery is low
1216 object organization state
1218 move the items on the floor to organize them by category
1220 objects are too close together on the floor
1222 path to one or more objects is obstructed
1224 object pick-up state
1226 the environment map comprises at least one drop-off container for a category of objects
1228 there are unobstructed items for pickup in the category of the container
1230 no objects are ready for pick-up
1232 all identified objects in category are picked up
1234 bucket is at capacity
1236 object drop-off state
1238 more items to pick up
1240 incomplete map of the environment
1700 robotic control algorithm
1702 block
1704 block
1706 block
1708 block
1710 block
1712 block
1714 block
1716 block
1718 block
1720 block
1722 block
1800 robotic control algorithm
1802 block
1804 block
1806 block
1808 block
1810 block
1812 block
1814 block
1816 block
1818 block
1820 block
1822 block
1900 robotic control algorithm
1902 item
1904 item
1906 item
1908 item
1910 item
1912 item
1914 item
1916 item
1918 item
2000 robotic control algorithm
2002 block
2004 block
2006 block
2008 block
2010 block
2012 block
2014 block
2016 block
2018 block
2020 block
2022 block
2100 robotic control algorithm
2102 block
2104 block
2106 block
2108 block
2110 block
2112 block
2114 block
2116 block
2118 block
2120 block
2122 block
2124 block
2126 block
2200 decluttering robot environment
2202 decluttering area
2204 scale invariant keypoints
2206 objects
2208 destination bins
2210 mobile device
2212 augmented reality robotic interface application
2214 camera frame
2216 global area map
2218 ground plane
2220 camera frame to global area map transform
2222 mobile device location
2224 decluttering robot location
2226 object starting locations
2300 augmented reality robotic interface
2302 bounding boxes
2304 user indicator
2306 category
2308 uncategorized
2310 musical instrument
2312 stuffed animals
2314 plastic toys
2316 clothing
2318 craft supplies
2320 user indicator
2322 user indicator
2324 user indicator
2326 user indicator
2400 robotic control system
2402 network interface
2404 input devices
2406 memory
2408 CPU
2410 storage devices
2412 logic
2414 output devices Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A method comprising:

associating each of a plurality of object categories for objects in an environment with corresponding containers situated in the environment;

activating a robot at a base station;

navigating the robot around the environment using cameras to map a type, a size, and a location of the objects in the environment;

for each object category:

choosing one or more of the objects to pick up in the category;

performing path planning to the one or more of the objects to pick up;

navigating to points adjacent to each of the one or more of the objects to pick up;

actuating manipulators coupled at both sides of a front end of a bucket at a front end of the robot, wherein the manipulators are coupled to open and close across the front end of the bucket to move obstacles out of the way and manipulate the one or more of the objects to pick up onto the bucket;

one or both of tilting and raising the bucket, and actuating the manipulators to retain the objects in the bucket;

navigating the robot adjacent to the corresponding container for the category;

aligning a back end of the robot with a side of the corresponding container; and one or both of tilting and raising the bucket along a path that is an arc from the front end of the robot to the back end of the robot above a chassis of the robot to deposit retained objects in the corresponding container.

2. The method of claim 1, further comprising:

operating the robot to organize the objects in the environment into clusters, where each cluster comprises only objects from one of the categories.

3. The method of claim 1, further comprising:

operating at least one first arm to actuate the manipulators of the robot to move obstacles out of the way and manipulate the one or more of the objects to pick up onto the bucket; and operating at least one second arm to tilt or raise the bucket.

4. The method of claim 3, where the at least one first arm is paired with a corresponding at least one second arm, and further comprising:

operating each pairing of the at least one first arm and the at least one second arm from a common originating pivot point.

5. The method of claim 1, wherein actuating the manipulators of the robot to move obstacles out of the way comprises actuating the manipulators to form a wedge in front of the bucket, and wherein the wedge formed in front of the bucket is configurable to form an opening sized to allow passage of a target object between the manipulators while preventing collection of unwanted objects.

6. The method of claim 1, wherein actuating the manipulators to retain the objects in the bucket comprises actuating the manipulators to form a barrier in front of the bucket.

7. The method of claim 1, further comprising:

operating a neural network to determine the type, size and location of the objects from images from the cameras.

8. The method of claim 1, further comprising:

generating scale invariant keypoints within a decluttering area of the environment based on input from a left camera and a right camera;

detecting locations of the objects in the decluttering area based on the input from the left camera and the right camera, thereby defining starting locations;

classifying the objects into the categories;

generating re-identification fingerprints for the objects, wherein the re-identification fingerprints are used to determine visual similarity between the objects;

localizing the robot within the decluttering area based on input from at least one of the left camera, the right camera, light detecting and ranging (LIDAR) sensors, and inertial measurement unit (IMU) sensors, to determine a robot location;

mapping the decluttering area to create a global area map including the scale invariant keypoints, the objects, and the starting locations; and re-identifying the objects based on at least one of the starting locations, the categories, and the re-identification fingerprints.

9. The method of claim 8, further comprising:

assigning persistent unique identifiers to the objects;

receiving a camera frame from an augmented reality robotic interface installed as an application on a mobile device;

updating the global area map with the starting locations and the scale invariant keypoints using a camera frame to global area map transform based on the camera frame; and generating indicators for the objects, wherein the indicators include one or more of next target, target order, dangerous, too big, breakable, messy, and blocking travel path.

10. The method of claim 9, further comprising:

transmitting the global area map and object details to the mobile device, wherein the object details include at least one of visual snapshots, the categories, the starting locations, the persistent unique identifiers, and the indicators of the objects;

displaying the updated global area map, the objects, the starting locations, the scale invariant keypoints, and the object details on the mobile device using the augmented reality robotic interface;

accepting inputs to the augmented reality robotic interface, wherein the inputs indicate object property overrides including change object category, put away next, don't put away, and modify user indicator;

transmitting the object property overrides from the mobile device to the robot; and updating the global area map, the indicators, and the object details based on the object property overrides.

11. A robotic system comprising:

a robot;

a base station;

a plurality of corresponding containers each associated with one or more object categories for objects in an environment;

a mobile application; and robotic control system logic configured to:

navigate the robot around the environment using cameras to map a type, a size, and a location of the objects in the environment;

for each object category:

choose one or more of the objects to pick up in the category;

perform path planning to the one or more of the objects to pick up;

navigate to points adjacent to each of the one or more of the objects to pick up;

actuate manipulators coupled at both sides of a front end of a bucket at a front end of the robot, wherein the manipulators are coupled to open and close across the front end of the bucket to move obstacles out of the way and manipulate the one or more of the objects to pick up onto the bucket;

one or both of tilt and raise the bucket, and actuate the manipulators to retain the one or more of the objects to pick up in the bucket;

navigate the robot adjacent to the corresponding container for the category;

align a back end of the robot with a side of the corresponding container; and one or both of tilt and raise the bucket along a path that is an arc from the front end of the robot to the back end of the robot above a chassis of the robot to deposit retained objects in the corresponding container.

12. The system of claim 11, wherein the robotic control system logic is further configured to operate the robot to organize the objects in the environment into clusters, where each cluster comprises only objects from one of the categories.

13. The system of claim 11, wherein the robot comprises at least one first arm and at least one second arm, the robotic control system logic further configured to:

operate the at least one first arm to actuate the manipulators of the robot to move obstacles out of the way and manipulate the one or more of the objects to pick up onto the bucket; and operate the at least one second arm to tilt or raise the bucket.

14. The system of claim 13, where the at least one first arm is paired with a corresponding at least one second arm, and each pairing of the at least one first arm and the at least one second arm have a common originating pivot point.

15. The system of claim 11, wherein the robotic control system logic is further configured to actuate the manipulators of the robot to form a wedge in front of the bucket, wherein the wedge formed in front of the bucket is configurable to form an opening sized to allow passage of a target object between the manipulators while preventing collection of unwanted objects.

16. The system of claim 11, wherein the robotic control system logic is further configured to actuate the manipulators to form a closed barrier in front of the bucket.

17. The system of claim 11, further comprising:

a neural network configured to determine the type, size and location of the objects from images from the cameras.

18. The system of claim 11, wherein the robotic control system logic is further configured to:

generate scale invariant keypoints within a decluttering area of the environment based on input from a left camera and a right camera;

detect locations of the objects in the decluttering area based on the input from the left camera and the right camera, thereby defining starting locations;

classify the objects into the categories;

generate re-identification fingerprints for the objects, wherein the re-identification fingerprints are used to determine visual similarity between the objects;

localize the robot within the decluttering area to determine a robot location; and map the decluttering area to create a global area map including the scale invariant keypoints, the objects, and the starting locations.

19. The system of claim 18, wherein the robotic control system logic is further configured to:

re-identify the objects based on at least one of the starting locations, the categories, and the re-identification fingerprints.

20. The system of claim 19, wherein the robotic control system logic is further configured to:

classify the objects as one or more of dangerous, too big, breakable, and messy.

* * * * *